(12) United States Patent
Masson

(10) Patent No.: US 8,564,358 B2
(45) Date of Patent: Oct. 22, 2013

(54) INTEGRATOR CIRCUIT WITH MULTIPLE TIME WINDOW FUNCTIONS

(75) Inventor: Gilles Masson, Renage (FR)

(73) Assignee: Commissariat a l'Energie Atomique et aux Energeries Alternatives, Paris (FR)

( * ) Notice: Subject to any disclaimer, the term of this patent is extended or adjusted under 35 U.S.C. 154(b) by 46 days.

(21) Appl. No.: 13/139,876

(22) PCT Filed: Dec. 17, 2009

(86) PCT No.: PCT/EP2009/067394
§ 371 (c)(1),
(2), (4) Date: Aug. 12, 2011

(87) PCT Pub. No.: WO2010/070041
PCT Pub. Date: Jun. 24, 2010

(65) Prior Publication Data
US 2011/0298520 A1    Dec. 8, 2011

(30) Foreign Application Priority Data

Dec. 17, 2008 (FR) ..................................... 08 58724

(51) Int. Cl.
*G06F 7/64* (2006.01)
(52) U.S. Cl.
USPC ............ 327/336; 327/337; 327/344; 327/345
(58) Field of Classification Search
USPC .................................. 327/336, 337, 344, 345
See application file for complete search history.

(56) References Cited

U.S. PATENT DOCUMENTS

| | | | |
|---|---|---|---|
| 6,304,128 B1 * | 10/2001 | Shulman | ......................... 327/345 |
| 7,242,461 B2 | 7/2007 | Hoashi | |
| 2001/0033607 A1 | 10/2001 | Fleming et al. | |
| 2002/0172170 A1 | 11/2002 | Muhammad et al. | |
| 2002/0177421 A1 | 11/2002 | Muhammad et al. | |
| 2002/0177422 A1 | 11/2002 | Muhammad et al. | |
| 2006/0072099 A1 | 4/2006 | Hoashi | |

FOREIGN PATENT DOCUMENTS

EP    1 643 656 A1    4/2006

* cited by examiner

*Primary Examiner* — Kenneth B. Wells
(74) *Attorney, Agent, or Firm* — Oblon, Spivak, McClelland, Maier & Neustadt, L.L.P.

(57) ABSTRACT

An integrator circuit with multiple time window functions for carrying out a plurality of integration operations in parallel, each integration operation being carried out in a coherent manner over a sequence of time windows including at least one such window. The circuit includes a plurality of integration paths each corresponding to an integration operation. The integration paths share a same voltage/current converter and a same first switching mechanism for switching a signal to be integrated at an input of the converter, each integration path further including at least one integration capacitor mounted in counter-reaction to a functional amplifier and receiving a resulting current via a second switching mechanism for selecting the path.

32 Claims, 24 Drawing Sheets

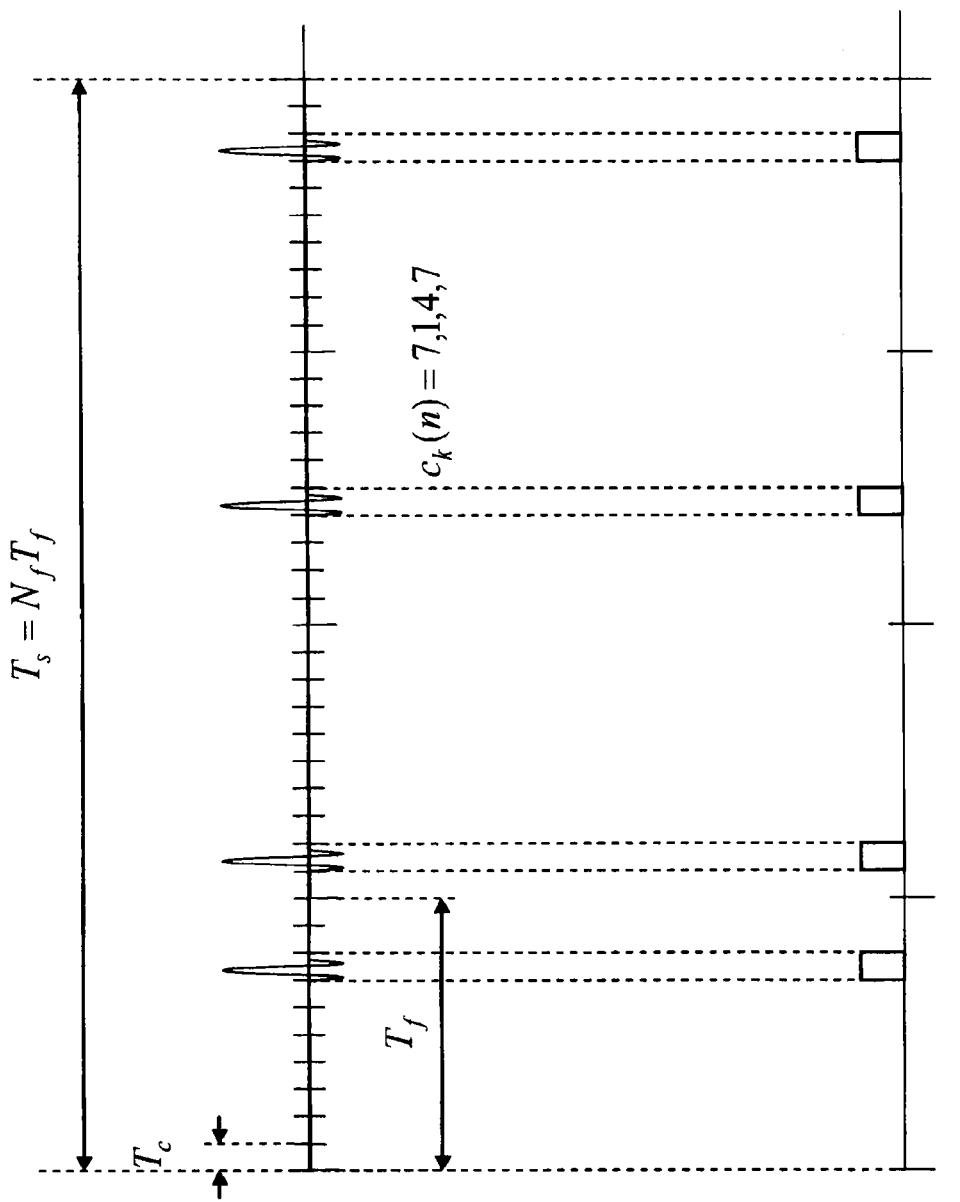

(Background)

(Background)

US 8,564,358 B2

INTEGRATOR CIRCUIT WITH MULTIPLE TIME WINDOW FUNCTIONS

TECHNICAL FIELD

The present invention relates to the field of integrator circuits with multiple time window functions. It is in particular applicable in UWB telecommunications systems of the impulse type and pulsed wave radar systems.

BACKGROUND OF THE INVENTION

Ultra wide band (UWB) telecommunications systems of the impulse type are well known from the prior art. In such a system, a symbol emitted by or intended for a given user is sent using a sequence of ultra-short waves, in the vicinity of a nanosecond or a hundredth of a picosecond.

FIG. 1 diagrammatically illustrates a user's signal corresponding to a given information symbol. This signal is made up of a temporal sequence of $N_f$ frames, each frame itself being divided into $N_c$ elementary intervals also called chip time.

The base signal relative to a user k, called TH-UWB (Time Hopped UWB) signal, can be expressed generally by:

$$s_k(t) = \sum_{n=0}^{N_f-1} p(t - nT_f - c_k(n)T_c) \quad (1)$$

where $p(t)$ is the shape of the elementary pulse, $T_c$ is a chip time, $T_f$ is the length of a frame with $N_f = N_c T_c$ where $N_c$ is the number of chips in an interval, the time sequence having total length $T_s = N_f T_f$ where $N_f$ is the number of frames in the sequence. The length $\tau$ of the elementary pulse is chosen to be smaller than the chip time. The sequence $c_k(n)$ for $n=0, \ldots, N_s-1$ defines the time hop code for the user k. The sequences of time hops are chosen so as to minimize the number of collisions between impulses belonging to time hop sequences relative to different users.

On the transmitter side, the user's base signal is modulated by the information symbol, for example using pulse position modulation (PPM):

$$s_k(t) = \sum_{n=0}^{N_f-1} p(t - nT_f - c_k(n)T_c - m\varepsilon) \quad (2)$$

where $\varepsilon$ is a modulation delay substantially shorter than the chip time $T_c$ and $m=0, \ldots, M-1$ is position M-PPM area.

On the receiver side, the received signal is the subject of multiple time window integration. The positions of the time windows depend on the user one wishes to receive. FIG. 1B shows the multiple time window signal associated with the user k. The time windows here are calibrated on the positions of the time hops $c_k(n)$.

In general, for a given user k, if the propagation delay is subtracted, the receiver performs an integration in some time windows of the received signal $r_k(t)$, or in time windows:
$w(t-nT_f-c_k(n)T_c)$, $n=0, \ldots, N_f-1$ for the first modulation position, or $I_0^k = \int r_k(t) w(t-nT_f-c_k(n)T_c) dt$,
$w(t-nT_f-c_k(n)T_c-m\varepsilon)$, $n=0, \ldots, N_f-1$ for the $(m+1)^{th}$ modulation position, or $I_m^k = \int r_k(t) w(t-nT_f-c_k(n)T_c-m\varepsilon) dt$,
$w(t-nT_f-c_k(n)T_c-(M-1)\varepsilon)$, $n=0, \ldots, N_f-1$ for the last modulation position, or:

$I_{M-1}^k = \int r_k(t) w(t-nT_f-c_k(n)T_c-(M-1)\varepsilon) dt$, where $w(t)$ is a bounded support function with a width slightly larger than the duration $\tau$ of the pulse $p(t)$.

The receiver estimates the modulation position and therefore the information symbol sent, by comparing the integrated values $I_m^k$ or:

$$\hat{m} = \underset{m}{\operatorname{argmax}}(I_m^k) \quad (3)$$

Multiple time window integration of a signal r(t) generally refers to a coherent integration operation over a plurality N of disjointed time windows:

$$I_s = \int r(t) \sum_{n=0}^{N-1} w_n(t) dt \quad (4)$$

where $w_n(t)$, $n=0, \ldots, N-1$, are bounded and disjointed support functions. It will be noted that in the aforementioned example, each of the values $m=0, \ldots, M-1$ is obtained through a multiple time window integration on $N_f$ windows.

Multiple time window integration is also used in pulsed wave radar receivers. Indeed, to determine whether a target is present in a given range bin, the receiver integrates the received signal, after having demodulated it if applicable, in a time window. In order to improve the signal to noise ratio, it is known to integrate the received radar signal coherently in a plurality of time windows spaced out over the recurrence period of the radar 1/PRF, where PRF (Pulse Recurrence Frequency) is the recurrence frequency of the radar.

A first known example of a multiple time window integrator circuit is shown in FIG. 2A.

The circuit comprises a plurality of window switches 211, 212, 213, 214, a voltage/current conversion module 220, also called transconductance block, converting the differential input voltage into a proportional current, a functional amplifier 230, two integration capacitors 241 and 242, mounted in counter-reaction between the differential outputs and inputs of the op-amp. The integrated signal appears in differential form between the outputs $V_{out}^+$ and $V_{out}^-$ of the integrator circuit. Two switches 251 and 252, respectively mounted in parallel on the two integration capacitors 241 and 242, ensure that the integrator is reset.

The voltage signal to be integrated is applied differentially between the inputs $V_{in}^+$ and $V_{in}^-$ of the integrator circuit. This signal is switched by the switches 211 and 213, by a multiple window logic signal $$w(t) = \sum_{n=0}^{N-1} w_n(t)$$

towards the differential inputs of the transconductance module 220.

One example of a multiple window logic signal $w(t)$ has already been shown in FIG. 1B. Each time window $w_n(t)$ has a bounded support $A_n$, for example $w_n=1$ if $t \in A_n$ and $w_n(t)=0$ otherwise. The time supports $A_n$ are disjointed and distributed over time uniformly (example of the aforementioned radar receiver) or non-uniformly (example of the aforementioned TH-UWB receiver).

The complementary logic signal $\overline{w}(t)$ switches the inputs of the transconductance module over a same reference voltage $V_{ref}$. Thus, outside the windows $w_n(t)$ one ensures that a null differential voltage is applied to the input of the module 220. The capacitors 241 and 242 integrate the output currents of the module 220. The output voltages $V_{out}^+$ and $V_{out}^-$ are such that at the end of the multiple window function, $V_{out}^+ - V_{out}^-$ represents a coherent integration of the input signal on the windows $w_n(t)$, or: $V_{out}^+ - V_{out}^- = \int \alpha(V_{in}^+ - V_{in}^-)w(t)dt$ where $\alpha$ is a constant that depends on the circuit.

The integrated value is reset by short circuiting the capacitors 241 and 242.

The integrator circuit illustrated in FIG. 2A has a high output impedance and good performance in terms of bandwidth and gain control.

A second example of an integrator circuit with multiple time window functions is shown in FIG. 2B. Identical elements bear the same references as in FIG. 2A. Unlike the circuit from FIG. 2A, the integrator circuit of FIG. 2B has a single-pole output configuration. This configuration makes it possible to eliminate a counter-reaction control loop with a shared mode and therefore to reduce the consumption of the circuit while increasing its bandwidth. To preserve the symmetry of the assembly, in particular to balance drains during switching, the capacitor 241 is, however, kept as well as its associated reset switch 251.

The integrator circuits of FIGS. 2A and 2B do not make it possible to perform, in parallel, a plurality of multiple window integration operations. For example, such an integrator circuit does not make it possible to obtain, in parallel, the values $I_m^k$ corresponding to the different positions PPM, m=0, . . . , M−1 of a TH-UWB system or to perform a coherent integration for different range bins in a pulsed wave radar system.

A first solution to perform parallel integration operations consists of providing as many integrator circuits as integration operations. For example, in the case of the TH-UWB telecommunication system described above, M integrator circuits could provide, in parallel, the values $I_m^k$ for the M modulation positions, m=0, . . . , M−1. Similarly, K parallel integrator circuits can provide integration results for K distinct users.

This solution is not, however, fully satisfactory inasmuch as the integrators can have a dispersion of their characteristics, for example the transconductance gain of the module 220 or the capacitor values of 241 and 242, which can lead to different integration constants $\alpha$ and therefore erroneous estimates (e.g. an erroneous estimate $\hat{m}$). Furthermore, the multiplication of the integrators causes a greater power consumption.

The problem at the root of the invention is therefore to propose an integrator circuit with a multiple time window function, capable of carrying out a plurality of parallel integration operations, while guaranteeing good precision and low consumption.

BRIEF DESCRIPTION OF THE INVENTION

The present invention is defined by an integrator circuit with multiple time window functions for carrying out a plurality of integration operations in parallel, each integration operation being carried out in a coherent manner over a sequence of time windows including at least one such window, said circuit comprising a plurality of integration paths each corresponding to an integration operation. Said integration paths share a same voltage/current converter and same first switching means for switching the signal to be integrated at the input of said converter, each integration path further including at least one integration capacitor mounted in counter-reaction to a functional amplifier and receiving the resulting current via second switching means for selecting said path.

Advantageously, the integrator circuit also comprises three switching means adapted to transferring the integrated charge in each integration capacitor towards a corresponding storage capacitor, when said plurality of integration operations is finished.

The integrator circuit can also comprise a fourth switching means to switch the voltages at the terminals of said storage capacitors towards the output of the integrator circuit, after the transfer of charges from the integration capacitors to the corresponding storage capacitors has been done.

Preferably, the first switching means are controlled by a first control signal obtained using an OR logic of the path signals, each path signal having a high logic level during the time windows of that path and a low logic level outside these windows.

According to a first alternative, said converter has a differential input and the first switching means applies the signal to be integrated between the input terminals of said converter when the first control signal is at a high logic level and a reference voltage at each of these terminals when it is at a low logic level.

According to a second alternative, said converter has a single-pole input and the first switching means applies the signal to be integrated to the input terminal of said converter, when the first control signal is at a high logic level, and a reference voltage at said terminal when it is at a low logic level.

According to a first embodiment, said integration paths share the same functional amplifier, the inputs of said amplifier respectively being connected to the outputs of said converter, and each path comprises a reference capacitor disposed between a reference voltage and a first input of the functional amplifier as well as an integration capacitor mounted in counter-reaction between the output of the functional amplifier and its second input.

The second switching means is then advantageously controlled by a path selection signal,
and connects, when this selection signal is at a high logic level:
  a first terminal of the reference capacitor to the reference voltage and the second terminal of said capacitor to the first input of the functional amplifier;
  a first terminal of the integration capacitor to the output of the functional amplifier and the second terminal of this capacitor to the second input of the functional amplifier;
and, when the selection signal is at a low logic level:
  disconnects the first terminal of the reference capacitor from the reference voltage and connects the second terminal of this capacitor to the reference voltage;
  disconnects the first terminal of the integration capacitor from the output of the functional amplifier and connects the second terminal of this capacitor to the reference voltage.

The integrator circuit advantageously comprises reset means adapted to applying said reference voltage simultaneously to the first and second terminals of the reference capacitor and to the first and second terminals of the integration capacitor when a reset is done.

The storage capacitors are typically mounted in parallel at the output of the functional amplifier, each storage capacitor having a first terminal connected to said output via the third switching means and a second terminal connected to said reference voltage. Preferably, said first terminals of the storage capacitors are also connected to the output of the integrator circuit via the fourth switching means.

According to one alternative of the first embodiment, said integration paths share the same functional amplifier, the inputs of said amplifier respectively being connected to the outputs of said converter, and each path comprises a first integration capacitor disposed in counter-reaction between a first output and a first input of the functional amplifier as well as a second integration capacitor disposed in counter-reaction between a second output and a second input of the functional amplifier.

The second switching means is advantageously controlled by a path selection signal, and
connects, when this selection signal is at a high logic level:
a first terminal of the first integration capacitor to the first output of the functional amplifier and the second terminal of this capacitor to the first input of the functional amplifier;
a first terminal of the second integration capacitor to the second output of the functional amplifier and the second terminal of this capacitor to the second input of the functional amplifier; and
when the selection signal is at a low logic level:
disconnects the first terminal of the first integration capacitor from the first output of the functional amplifier and connects the second terminal of this capacitor to the reference voltage;
disconnects the first terminal of the second integration capacitor from the second output of the functional amplifier and connects the second terminal of this capacitor to the reference voltage.

The integrator circuit can also comprise reset means adapted to apply said reference voltage simultaneously to the first and second terminals of the first integration capacitor and the first and second terminals of the second integration capacitor when a reset is done.

Typically, the storage capacitors are mounted in parallel between the first and second outputs of the functional amplifier, each storage capacitor having a first terminal and a second terminal respectively connected to the first and second outputs of the functional amplifier via the third switching means. Preferably, said first terminals of the storage capacitors are connected to a first output of the integrator circuit and said second terminals of the storage capacitors are connected to a second output of the integrator circuit, via the fourth switching means.

According to a second embodiment, each integration path comprises a functional amplifier, the inputs of said amplifier respectively being connected to the outputs of said converter via the second switching means, a reference capacitor disposed between a reference voltage and a first input of the functional amplifier as well as an integration capacitor disposed in counter-reaction between the output of the functional amplifier and its second input.

The second switching means is then advantageously controlled by a path selection signal and, for each path, it connects and disconnects, when this selection signal is at a high logic level and a low logic level, respectively, the outputs of the converter to the inputs of the functional amplifier.

The integrator circuit can also comprise reset means, adapted to apply said reference voltage simultaneously to the first and second terminals of the reference capacitor and to the first and second terminals of the integration capacitor, when a reset is done.

Typically, the integrator circuit comprises, for each path, a storage capacitor having a first terminal connected to the output of the functional amplifier, via the third switching means, and a second terminal connected to said reference voltage. Preferably, said first terminal of the storage capacitor is also connected to the output of the integrator circuit via the fourth switching means.

According to one alternative of the second embodiment, each integration path comprises a functional amplifier, the inputs of said amplifier being respectively connected to the outputs of said converter via the second switching means, a first integration capacitor mounted in counter-reaction between a first output and a first input of the functional amplifier as well as a second integration capacitor mounted in counter-reaction between a second output of the functional amplifier and its second input.

The second switching means is advantageously controlled by a path selection signal and, for each path, it connects and disconnects when this selection signal is at a high logic level and at a low level, respectively, the outputs of the converter to the inputs of the functional amplifier.

The integrator circuit can also comprise, for each path, reset means, adapted to apply said reference voltage simultaneously to the first and second terminals of the first integration capacitor as well as the first and second terminals of the second integration capacitor, when a reset is done.

Typically, the integrator circuit comprises, for each path, a storage capacitor having a first terminal connected to the first output of the functional amplifier and a second terminal connected to its second output, via the third switching means. Preferably, said first and second terminals of the storage capacitor are also connected via the fourth switching means, respectively to a first output and to a second output of the integrator circuit.

According to a third embodiment, said integration paths are distributed in a plurality of subassemblies and the second switching means comprises a first rank second means for selecting a subassembly of paths among said plurality of subassemblies, and second rank second means for selecting a path within a subassembly, and each subassembly of paths comprises a functional amplifier, the inputs of said amplifier respectively being connected to the outputs of said converter via the first rank second switching means;

the paths of a subassembly sharing the functional amplifier relative to this subassembly, each path of said subassembly comprising a reference capacitor disposed between a reference voltage and a first input of said amplifier as well as an integration capacitor mounted in counter-reaction between the output of said amplifier and its second input.

According to one alternative of the third embodiment, said integration paths are distributed in a plurality of subassemblies and the second switching means comprises a first rank second means for selecting a subassembly of paths among said plurality of subassemblies and a second rank second means for selecting a path within a subassembly, and each subassembly of paths comprises a functional amplifier, the inputs of said amplifier being respectively connected to the outputs of said converter via the first rank second switching means, the paths of a subassembly share the functional amplifier relative to that subassembly, each path of said subassembly comprising a first integration capacitor mounted in counter-reaction between a first output and a first input of this amplifier as well as a second integration capacitor mounted in counter-reaction between a second output and its second input.

BRIEF DESCRIPTION OF THE DRAWINGS

Other features and advantages of the invention will appear upon reading one preferred embodiment of the invention done in reference to the appended figures in which:

FIG. 1A shows an example of a user signal in a UWB telecommunications system;

FIG. 1B shows an example of a multiple time window function for receiving the user signal of FIG. 1A;

DETAILED DESCRIPTION OF THE INVENTION

The idea at the base of the invention is to multiplex all or some of the integration operations with multiple time window functions within at least one part of the integrator circuit.

Figure 2A:
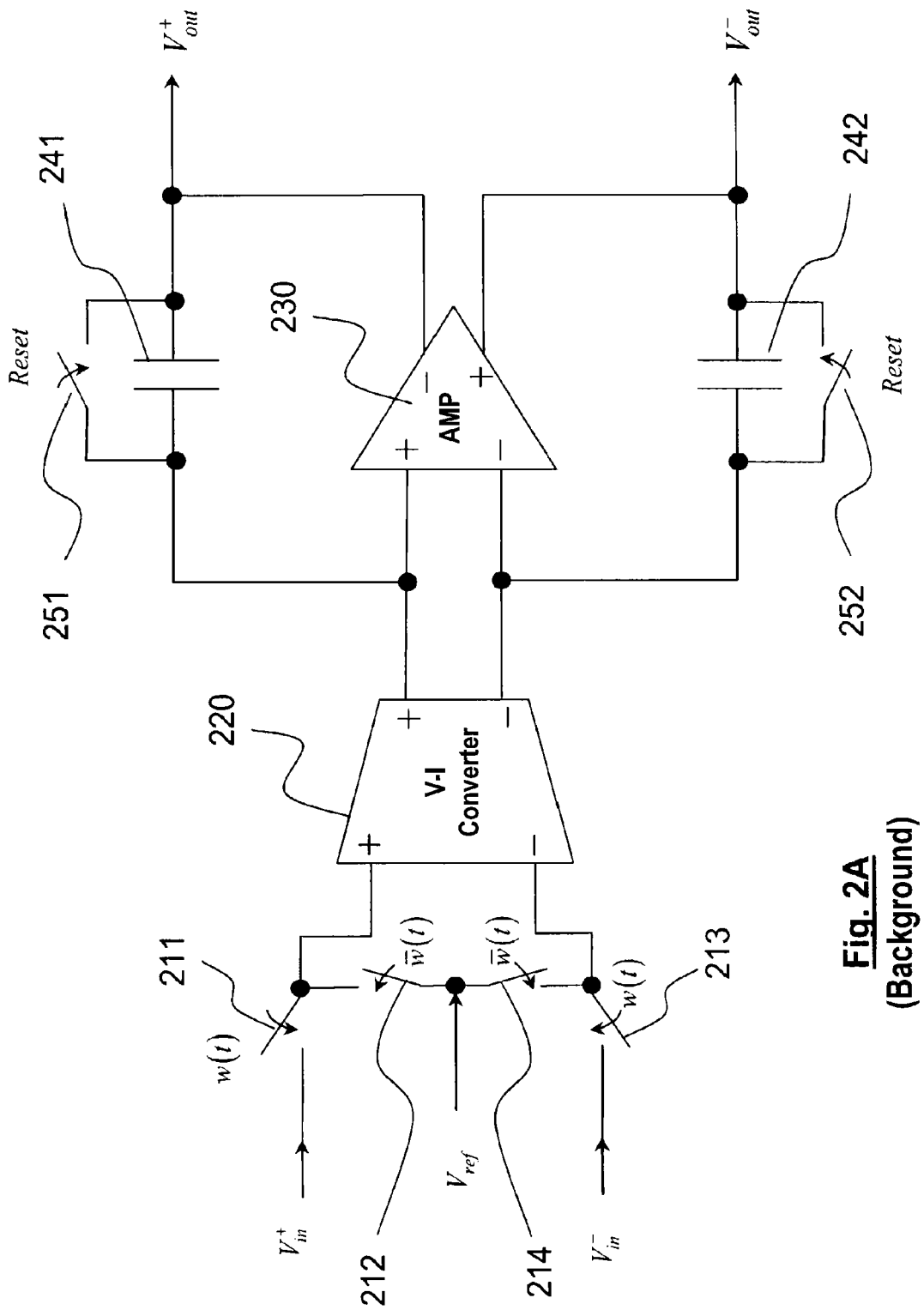
FIGS. 2A and 2B show two examples of an integrator circuit with time window functions known from the state of the art.
Figure 2B:
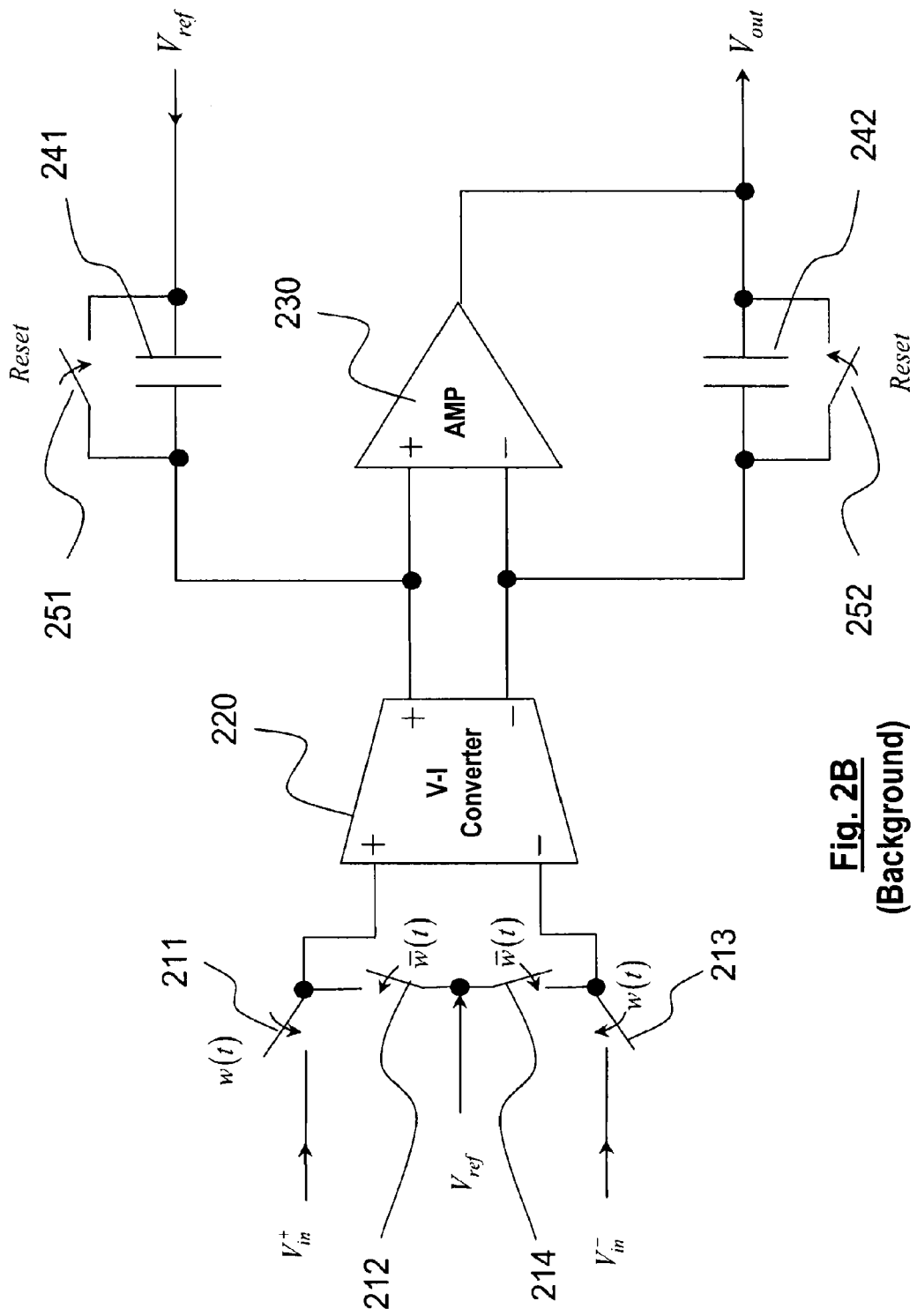
Figure 3:
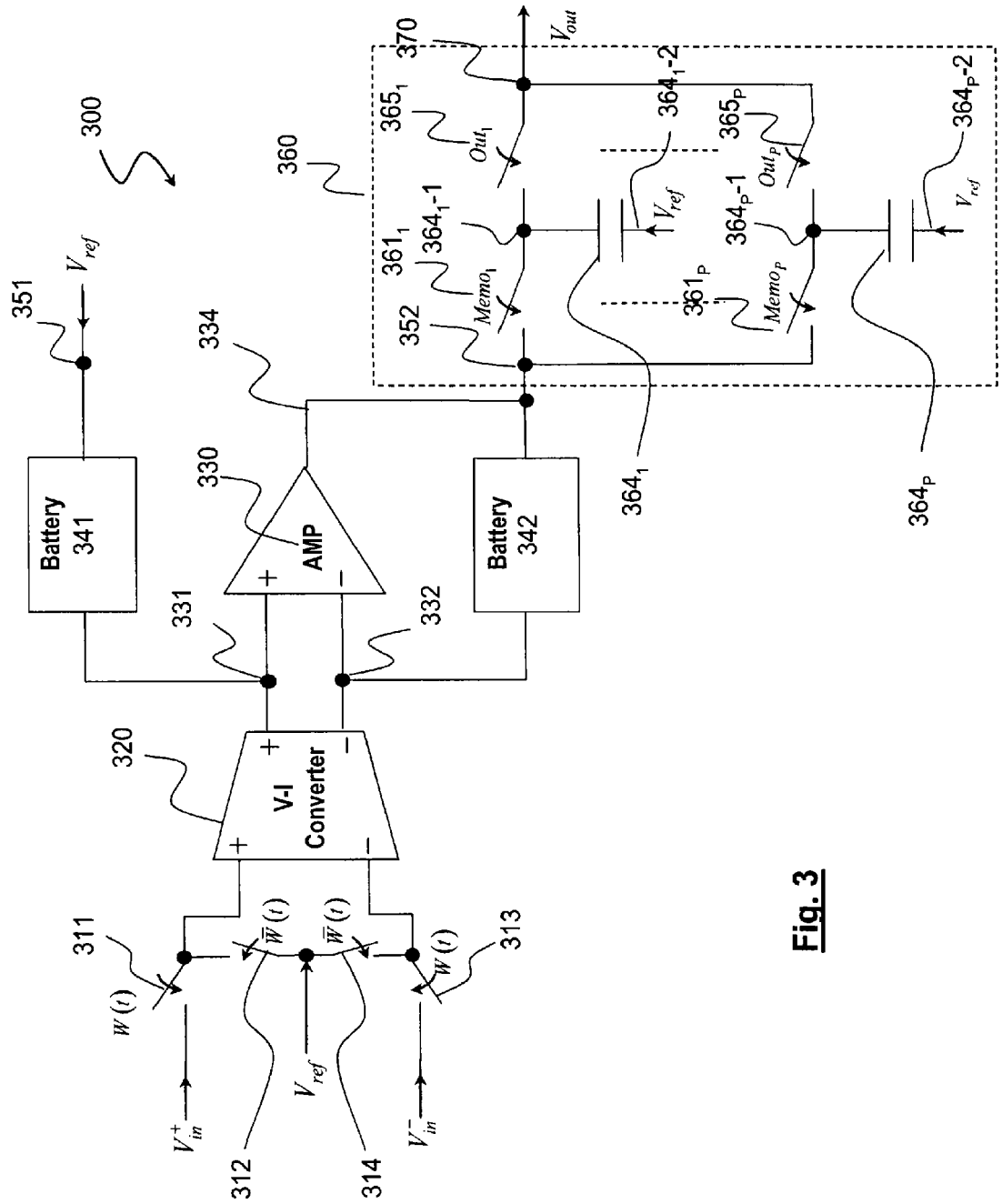
FIG. 3 diagrammatically illustrates an integrator circuit with multiple time window functions according to a first embodiment of the invention.

A first embodiment of the invention is illustrated in FIG. 3. The integrator circuit 300, like the integrator circuit 200, comprises a plurality of switches 311 to 314, a voltage/current conversion module 320, and a functional amplifier 330. The switches 311 and 313 are controlled by a same logic signal W. As shown later, the signal W is a composite window function signal. When the signal W is active, the switches 311 and 313 respectively apply the voltages and $V_{in}^+$ and $V_{in}^-$, forming the differential voltage, to the conversion module 320. The switches 312 and 314 are controlled by the complementary logic signal $\overline{W}$. When the signal $\overline{W}$ is active, the reference voltage $V_{ref}$ is applied by the switches 312 and 314 to the inputs of the conversion module 320, which corresponds to a null differential input voltage.

The differential current output of the conversion module 320 is connected to the differential input of the op-amp 330.

Unlike the circuit 200, the integrator circuit 300 comprises a first battery 341 of P integration capacitors, situated between the terminal 351 and a first input (virtual mass) 331 of the op-amp 330. The reference voltage $V_{ref}$ is continuously applied on the output terminal 351. Similarly, the circuit comprises a second battery 342 of P integration capacitors, mounted in negative counter-reaction between the output 334 of the op-amp and its second input 332. The batteries 341 and 342 of integration capacitors have the same structure 340, described below.

Figure 3A:
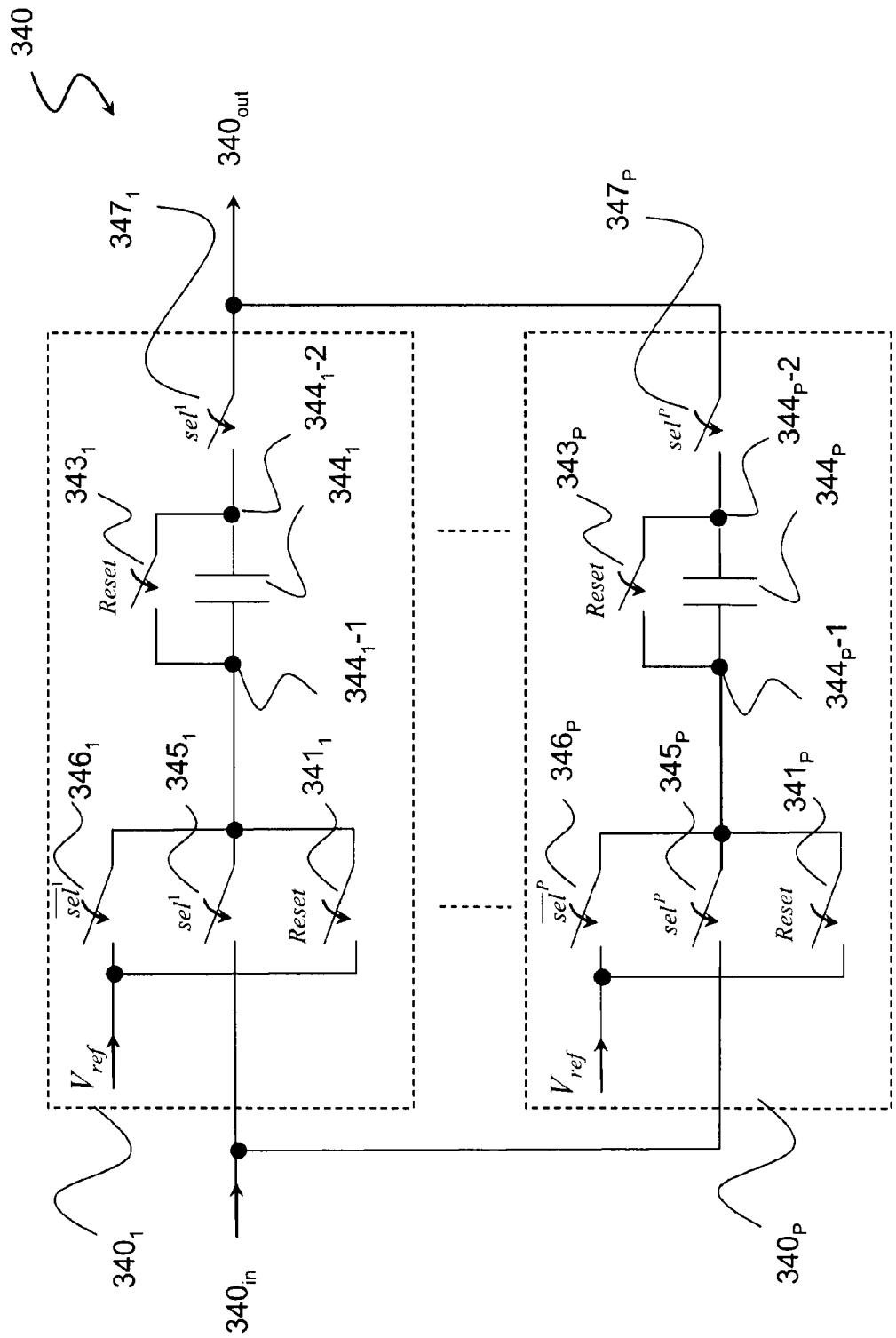
FIG. 3A shows the structure of a battery of integration capacitors used in the circuit of FIG. 3.

The shared structure of the batteries of integration capacitors is shown in FIG. 3A. The battery 340 comprises a plurality P of identical modules noted $340_1, \ldots, 340_P$, connected to a shared input terminal $340_{In}$ and a shared output terminal $340_{Out}$.

Each module $340_p$ comprises a capacitor $344_p$, having a capacitor value C, a pair of selection switches $345_p$ and $347_p$ controlled by the logic signal $sel^p$ and an idle switch $346_p$ controlled by the complementary signal $\overline{sel^p}$. When the signal $sel^p$ is active, the terminal $344_p$-1 is connected via the switch $345_p$ to the input terminal $340_{In}$. Likewise, the terminal $344_p$-2 is connected via the switch $347_p$ to the output terminal $340_{Out}$. The capacitor $344_p$ is thus selected in the counter-reaction loop of the op-amp and the current generated by the conversion module 320 charges the capacitor in question. As shown later, the various signals $sel^p$ make it possible to select different windows within the composite signal W.

Conversely, when the signal $\overline{sel^p}$ is active, the terminal $344_p$-1 remains subject to the reference voltage $V_{ref}$ via the switch $346_p$ and the terminal $344_p$-2 is disconnected from the output $340_{Out}$ by the switch $347_p$. No current circulates through the capacitor $344_p$ and the application of the voltage $V_{ref}$ prevents any discharge of the capacitor $344_p$ during the switch.

Each module $340_p$ also comprises a switch $341_p$, mounted in parallel with the switches $345_p$ and $346_p$ between the terminals $340_{In}$ and $341_p$-1, as well as a switch $343_p$ mounted in parallel with the capacitor $344_p$. The switches $341_p$ and $343_p$ are both controlled by the reset logic signal Reset. When the Reset signal is active, the capacitor is discharged by a short circuit between its terminals and its terminals are brought to the reference potential $V_{ref}$.

Returning to FIG. 3, the output terminal 352 of the second battery 342 of integration capacitors is connected to a battery 360 of storage capacitors. It comprises a plurality P of storage capacitors $364_p$, p=1, …, P. A same plurality P of switches $361_p$ respectively switches the input terminal 352 on the terminals $364_p$-1 of the capacitors $364_p$, p=1, …, P. More precisely, when the control signal $Memo_p$ is active, the switch $361_p$ connects the input 352 to the terminal $364_p$-1 of the storage capacitor $364_p$. The terminals $364_p$-1 are also connected to the output 370 via output switches $365_p$, respectively controlled by logic signals $Out_p$, p=1, …, P. The other terminals $364_p$-2 of the capacitors $364_p$ are kept at the reference voltage $V_{ref}$.

Figure 3B:
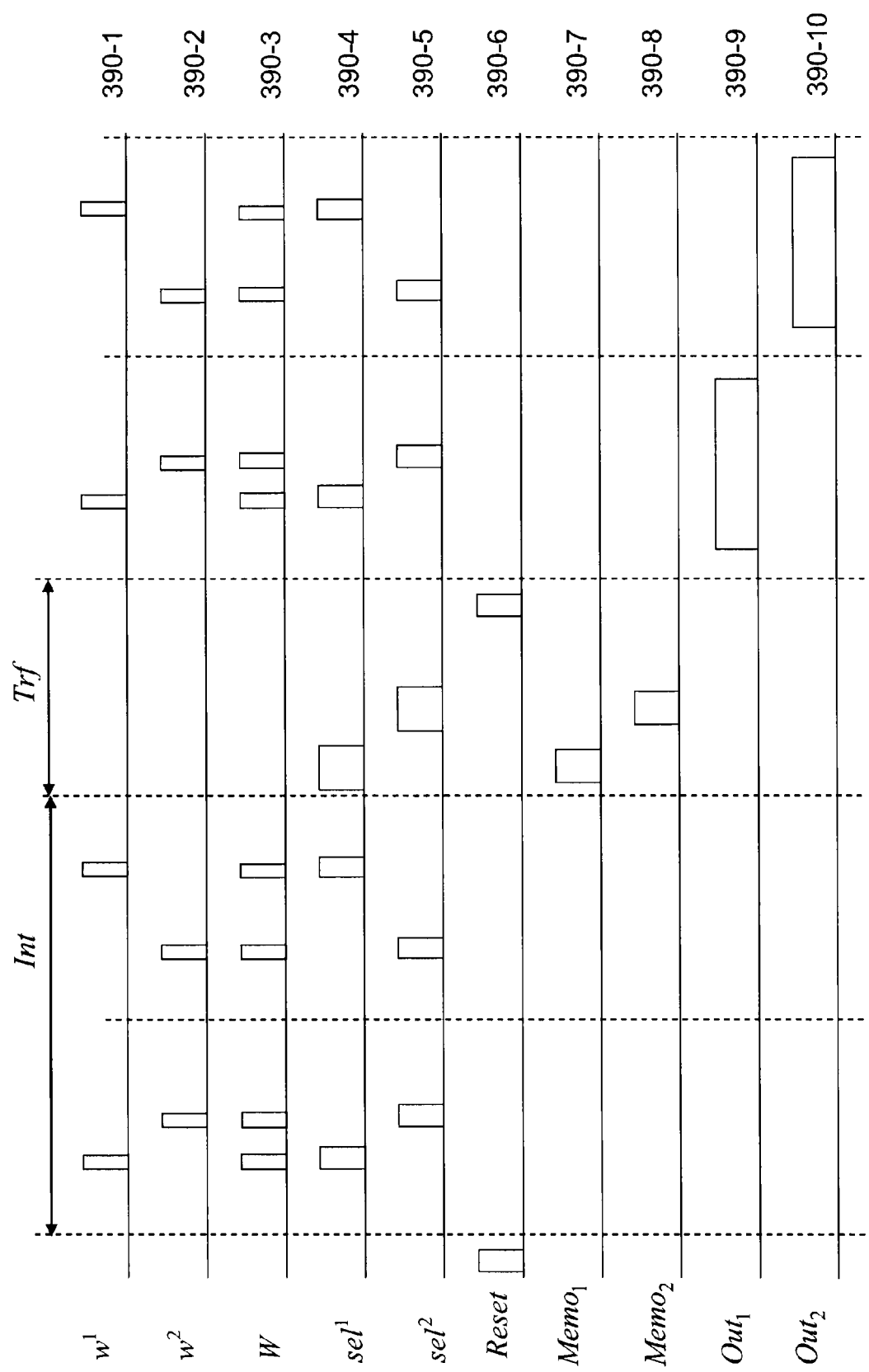
FIG. 3B provides an example of an operating chronogram of the integrator circuit of FIG. 3.

FIG. 3B illustrates the operating chronogram of the integrator circuit of FIG. 3.

As an illustration it has been assumed that P=2. For example, the integrator circuit will be able to analyze two users in a system, or two modulation positions of a user in a TH-UWB system, or two distinct range bins in a radar system.

In 390-1 and 390-2 we have shown, respectively, first ($w^1$) and second ($w^2$) multiple window function signals. Each multiple window function signal generally includes a plurality N of time windows, i.e.:

$$w^p(t) = \sum_{n=1}^{N} w_n^p(t)$$

The time windows $w_n^p(t)$, p=1, ..., P, n=1, ..., N do not overlap.

In the illustrated case, N=2.

The composite window function signal W was shown in 390-3. It is obtained by using an OR logic of the multiple window function signals $w^p$, i.e.:

$$W = \bigvee_{p=1,...,P} w^p \quad (5)$$

The selection signals $sel^p$, p=1, 2 are given in 390-4 and 390-5, respectively. The signal $sel^p$ has rising pulse edges synchronous with those of the multiple window function signal $w^p$. Alternatively, the rising pulse edges of $Sel^p$ can slightly precede those of $w^p$. In any case, the descending pulse edges of $sel^p$ are delayed by a time τ relative to the descending pulse edges of $w^p$. The time τ is determined to take into account the travel time of the conversion module 320 and the reestablishment time at the end of integration into a time window. Thus, on the $n^{th}$ descending pulse edge of $sel^p$, it is certain that the input signal has been taken into account and integrated in the entire duration of the time window $w_n^p$ by the integration capacitor 344$_p$. It will be noted that the signal $sel^p$ makes it possible to select the multiple window function signal $w^p$, i.e. the time windows $w_n^p$, within the composite signal W, or $w^p = W \wedge sel^p$.

The reset signal Reset is given in 390-6. A reset occurs before the beginning of an integration cycle, i.e. before the beginning of the P parallel integration operations. It polarizes the different elements of the circuit at the reference voltage, which guarantees a stable and reproducible initialization of the circuit upon each integration cycle Int.

The integration cycle Int is followed by a transfer cycle Trf in which the P integration results are sequentially transferred to the storage capacitors 364$_p$ owing to the controls Memo$_p$, p=1, 2 shown in 390-7 and 390-8. When the signals $sel^p$ and Memo$_p$ are simultaneously active, the charge contained in the integration capacitor 344$_p$ is transferred to the associated storage capacitor 364$_p$ via the switches 347$_p$ and 361$_p$. Once all of the integration results have been transferred into the storage capacitors, a reset Reset can take place. This reset does not affect the charges stored in the battery of storage capacitors 360.

The results thus stored can be read during the following integration cycle using reading signals Out$_p$, p=1, 2, shown in 390-9 and 390-10. When the signal Out$_p$ is active, the voltage present at the terminal 364$_p$-1 can be read on the output terminal 370 of the circuit. Thus, the reading of the integration results of the preceding cycle can take place in parallel with the integration operations of the current cycle.

The fact that the integration operations use the same conversion module and the same functional amplifier makes it possible to reduce the dispersion and therefore substantially improve the precision and reliability of the integration results.

Figure 4:
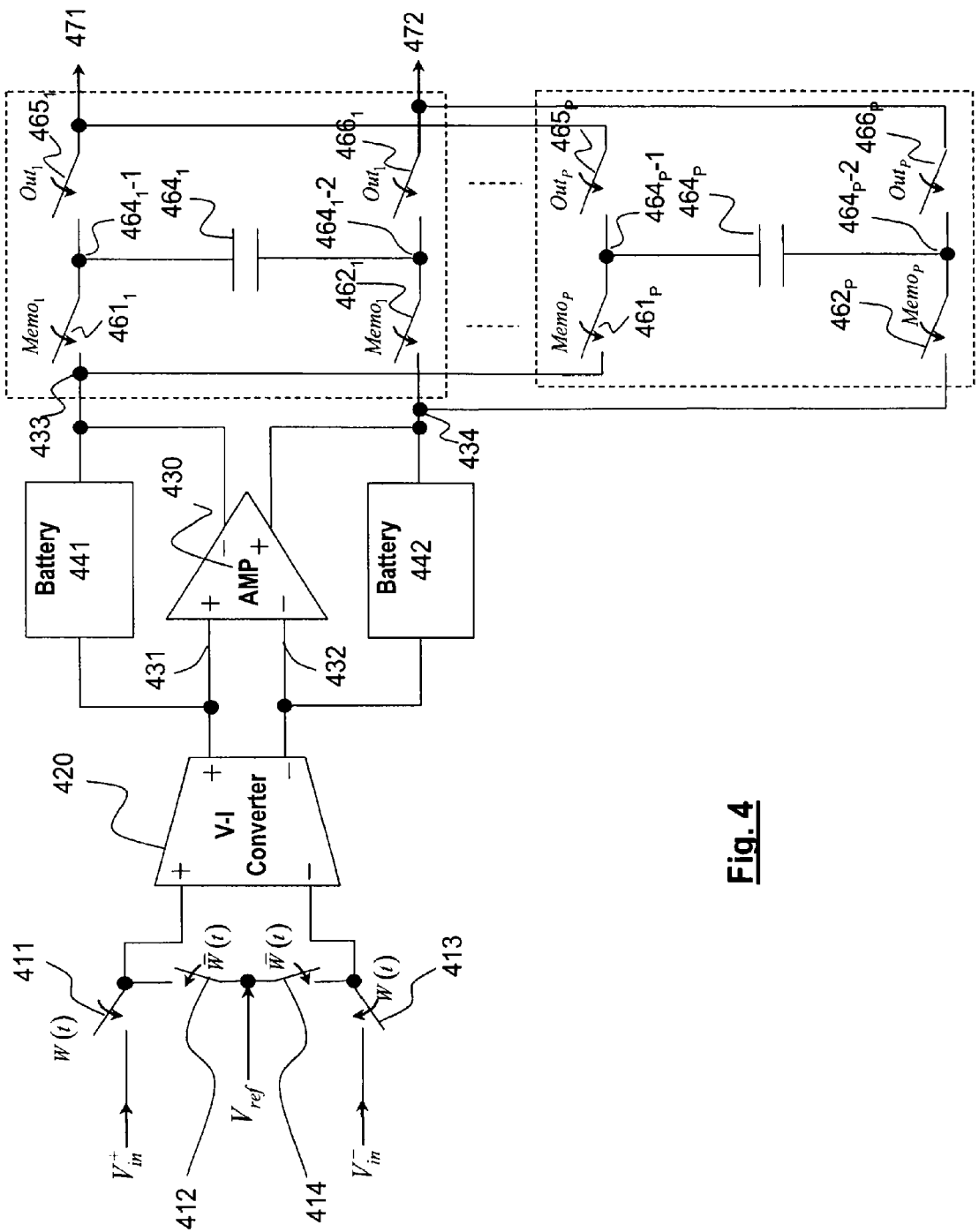
FIGS. 4 to 6 respectively show first, second, and third alternative embodiments of the integrator circuit of FIG. 3.

FIG. 4 shows a first alternative embodiment of the integrator of FIG. 3. Elements identical to those of FIG. 3 are designated using the same reference numbers increased by 100. This alternative differs from the preceding circuit in that the output is not single-pole, but differential. The two batteries of integration capacitors 441 and 442 are mounted in respective negative counter-reaction between the differential outputs and inputs of the functional amplifier. They have the same structure as shown in FIG. 3A.

The outputs of the two batteries 441 and 442 are connected to the terminals 433 and 434 between which a plurality P of storage capacitors 464$_p$ is mounted in parallel. The terminals 464$_p$-1, p=1, ..., P, are connected to the terminal 433 through the switches 461$_p$ and to the output terminal 471 through the switches 465$_p$, respectively. Similarly, the terminals 464$_p$-2, p=1, ..., P, are connected to the terminal 434 through the switches 462$_p$ and to the output terminal 472 through the switches 466$_p$, respectively. The switches 461$_p$ and 462$_p$, p=1, ..., P, are respectively controlled by the controls Memo$_p$, p=1, ..., P: they make it possible to transfer the charges stored in the integration capacitors, selected by the commands $sel^p$ within 441 and 442 towards the storage capacitors. The switches 465$_p$ and 466$_p$, p=1, ..., P, are respectively controlled by the controls Out$_p$, p=1, ..., P. When the signal Out$_p$ is active, the voltage present between the terminals of the capacitor 464$_p$ can be read between the output terminals 471 and 472 of the circuit.

Figure 5:
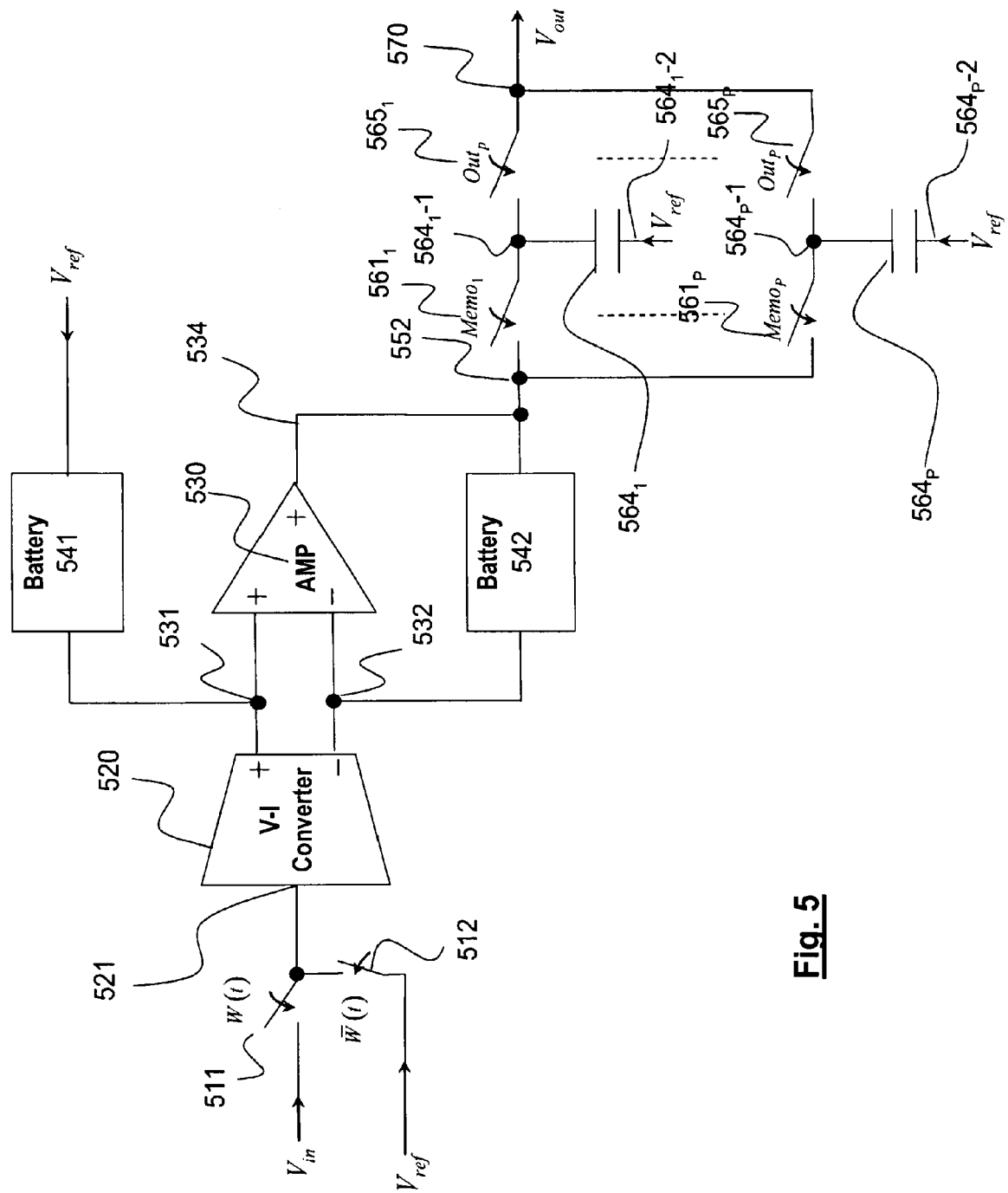

FIG. 5 illustrates a second alternative embodiment of the circuit of FIG. 3. It differs therefrom in that the input of the voltage/current conversion module is single-pole, i.e. the current generated by this module is proportional to the voltage applied either to the voltage $V_{in}$ of the signal to be integrated by the switch 511, or the reference voltage $V_{ref}$ by the switch 512. The switch 511 is controlled by the composite window function signal W and the switch 512 by its complement $\overline{W}$.

The rest of the circuit is identical to that of FIG. 3, the same elements bearing the same reference numbers increased by 200.

Figure 6:
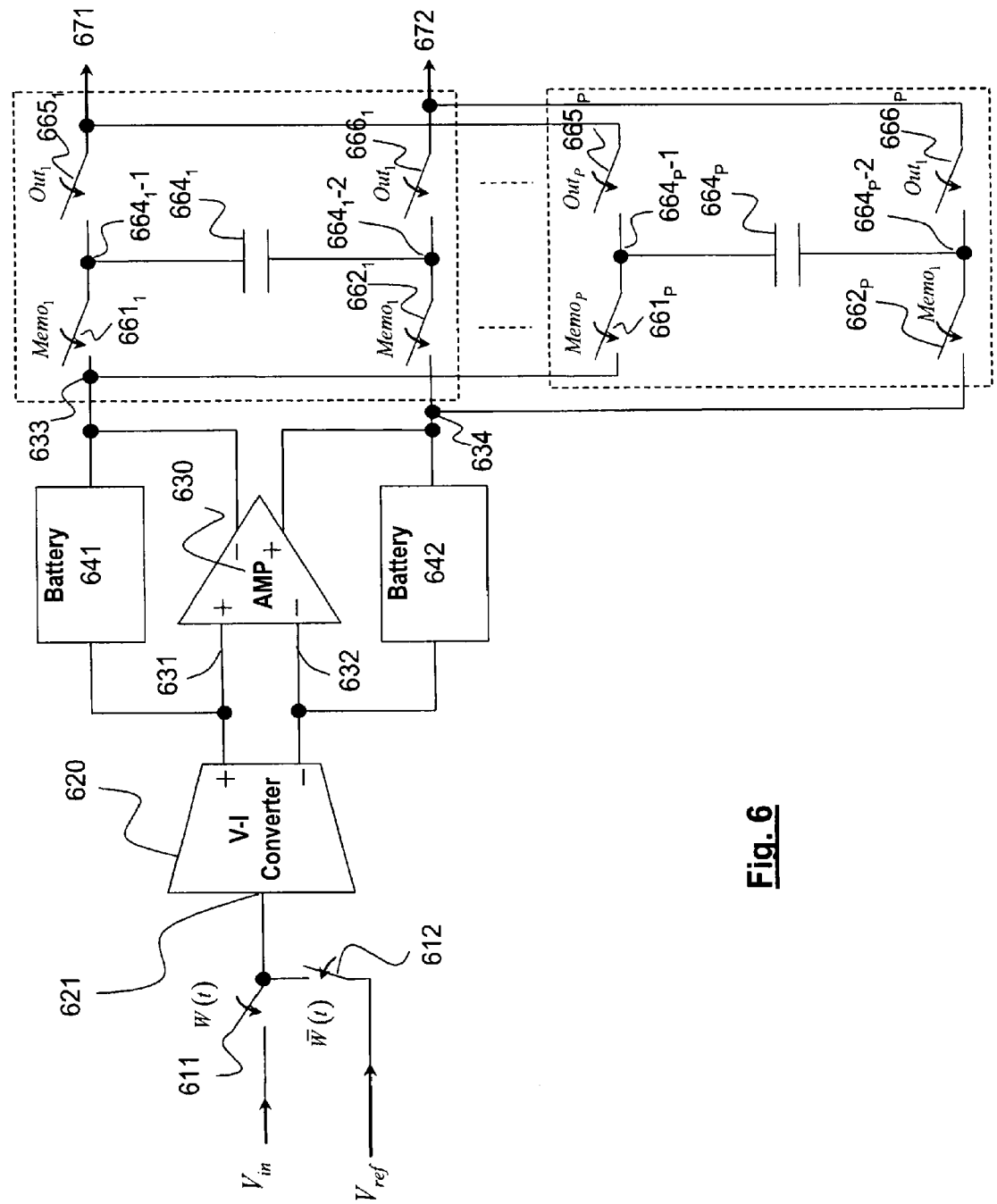

FIG. 6 shows a third alternative embodiment of the integrator according to FIG. 3. This alternative embodiment has a differential output like the first alternative, but a single-pole input like the second alternative. It will therefore not be described in more detail. Elements identical to those of FIG. 4 and FIG. 5 are increased by 200 and 100, respectively.

Figure 7:
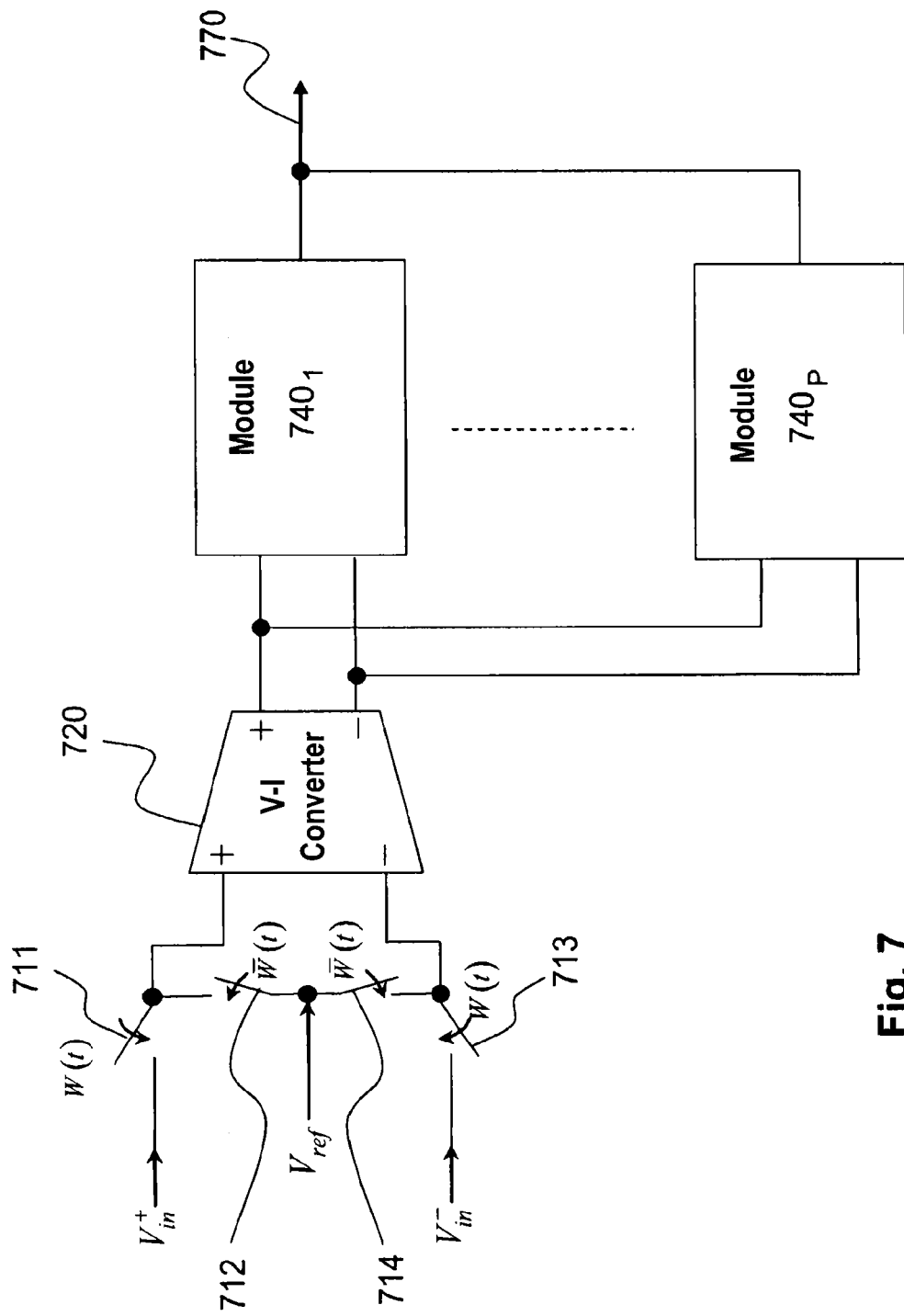
FIG. 7 diagrammatically illustrates an integrator circuit with multiple time window functions according to a second embodiment of the invention.

FIG. 7 shows a second embodiment of the integrator circuit according to the invention.

According to this embodiment, the input switches and the voltage/current conversion module are shared by the different integration operations with multiple window functions as in the first embodiment. More specifically, elements 711-714, 720 are identical to elements 311-314, 320, respectively.

However, the P integration, storage, and reading operations are performed within distinct modules 740$_1$, ..., 740$_P$, mounted in parallel on the outputs of the conversion module 720. The different modules 740$_p$ are connected at their output to the output terminal of the circuit 770. The different modules 740$_p$, p=1, ..., P all have the same structure illustrated in FIG. 7A.

Figure 7A:
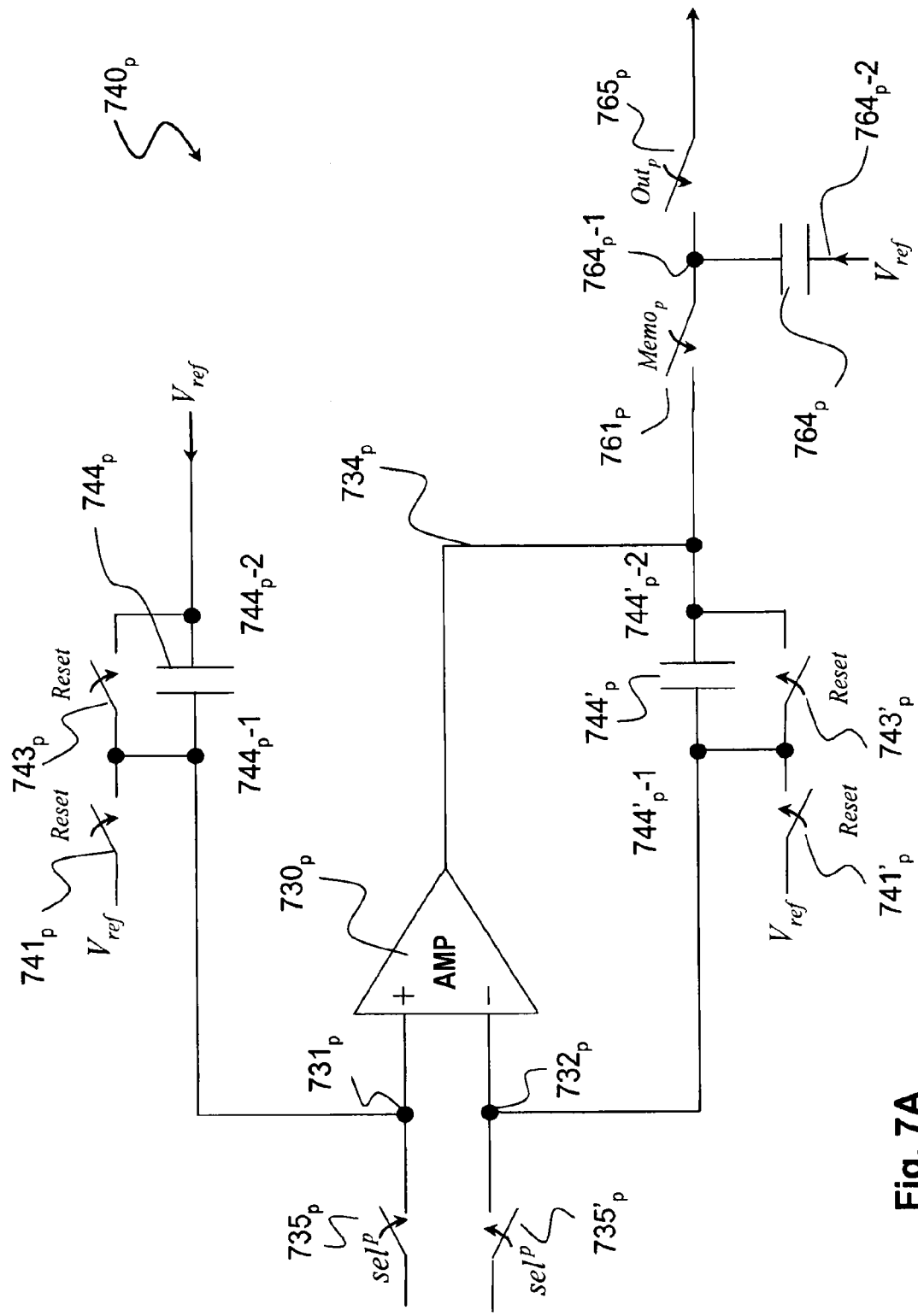
FIG. 7A shows the structure of a module used in the circuit of FIG. 7.

FIG. 7A shows the structure of a module 740$_p$. This module is organized around a functional amplifier 730$_p$ whereof the inputs 731$_p$ and 732$_p$ are respectively connected to the output terminals of the conversion module 720 through two switches 735$_p$ and 735'$_p$ controlled by the same command $sel^p$.

A first capacitor 744$_p$, called reference capacitor, with value C, is disposed between the reference voltage $V_{ref}$ and a first input 731$_p$ of the op-amp. A second integration capacitor 744'$_p$ of the same value is mounted in negative counter-reaction between the output of the op-amp and its second input $732_p$ (the values of the capacitors $744_p$ and $744'_p$, p=1, . . . , P are all equal to C). A switch $743_p$ (resp. $743'_p$) controlled by the reset signal Reset is mounted in parallel between the terminals of the capacitor $744_p$ (resp. $744'_p$). Furthermore, a switch $741_p$ (resp. $741'_p$) also controlled by the signal Reset, connects the terminal $744_p$-1 (resp. $741'_p$-1) of the capacitor $744_p$ (resp. $744'_p$) to the voltage $V_{ref}$. Thus, when the signal Reset is active, the capacitors $744_p$ and $744'_p$ are short circuited and their terminals polarized at the voltage $V_{ref}$.

The terminal $764_p$-1 of the storage capacitor $764_p$ is connected, on one hand, to the terminal $744'_p$-2 of the integration capacitor, via the transfer switch $761_p$ and, on the other hand, to the output of the integrator circuit 770, via the reading switch $765_p$. The transfer switch $761_p$, controlled by the signal Memo$_p$ makes it possible to transfer the charge integrated into $744'_p$ to the corresponding storage capacitor $764_p$. The reading switch $765_p$, controlled by the reader signal Out$_p$, makes it possible to show, on the output 770, the voltage corresponding to the stored charge.

Figure 7B:
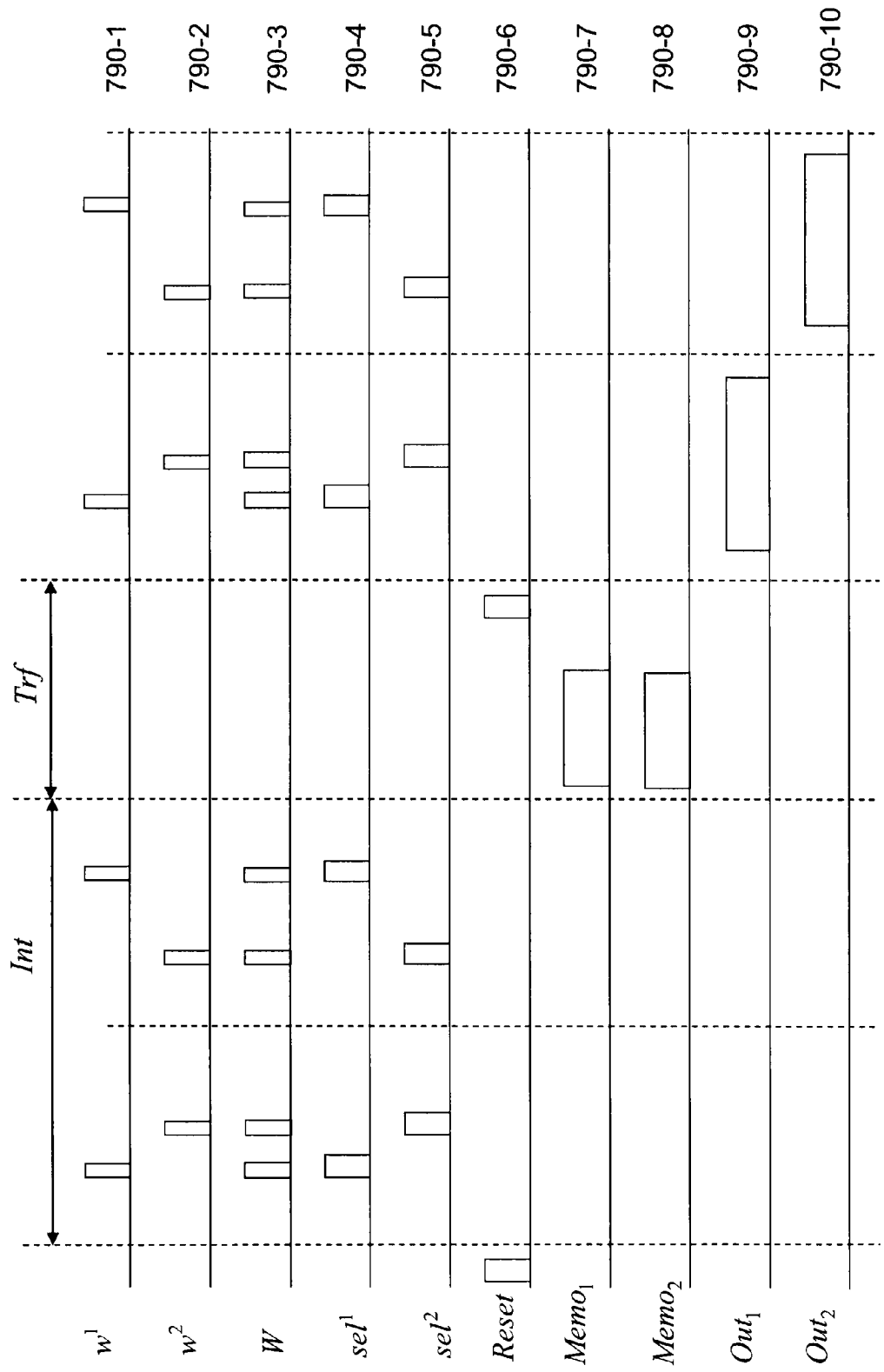
FIG. 7B shows an operating chronogram of the integrator circuit of FIG. 7.

FIG. 7B shows an operating chronogram of the integrator according to the second embodiment, for example with p=2 and N=2.

The multiple window function signals $w^1$, $w^2$ and the composite signal W shown in 790-1, 790-2 and 790-3 are identical to those of FIG. 3B. However, it will be noted that the selection signals sel$^p$, p=1, 2, in 790-4 and 790-5 are slightly different from the preceding ones. Indeed, due to the physical separation of the various modules $740_p$ in the second embodiment, it is not necessary to multiplex the transfer of the charges from the integration capacitors towards the storage capacitors. Thus, the signals sel$^p$ do not need to be active during the transfer cycle Trf. Likewise, the storage signals Memo$_p$ are advantageously all identical, the transfer of the charges then being done simultaneously and in parallel during the transfer cycle. The reading of the stored values can be done, as in FIG. 3A, during the following integration cycle, by sequentially activating the commands Out$_p$), as indicated in 790-9 and 790-10.

The second embodiment has, relative to the first, the advantage of allowing very rapid switching from one time window to the other. If the multiple window signals $w^1$ and $w^2$ are very close, for example if the windows $w_1^1$ and $w_1^2$ follow each other at short intervals, the independence of the modules $740_1$ and $740_2$ ensures the independence of the integration operations. In particular, the selection switches relative to the first window do not create a current disruption in the counter-reaction loop relative to the second window.

The second embodiment also makes it possible to obtain a high level of precision owing to the sharing of the voltage/current conversion module by the P parallel integration operations.

It also makes it possible to accelerate the charge transfer phase between the integration capacitors and the storage capacitors since this transfer can be done in parallel.

Despite a plurality of functional amplifiers, the integrator circuit according to the second embodiment has a relatively modest consumption due to the use of a shared voltage/current conversion module.

Figure 8:
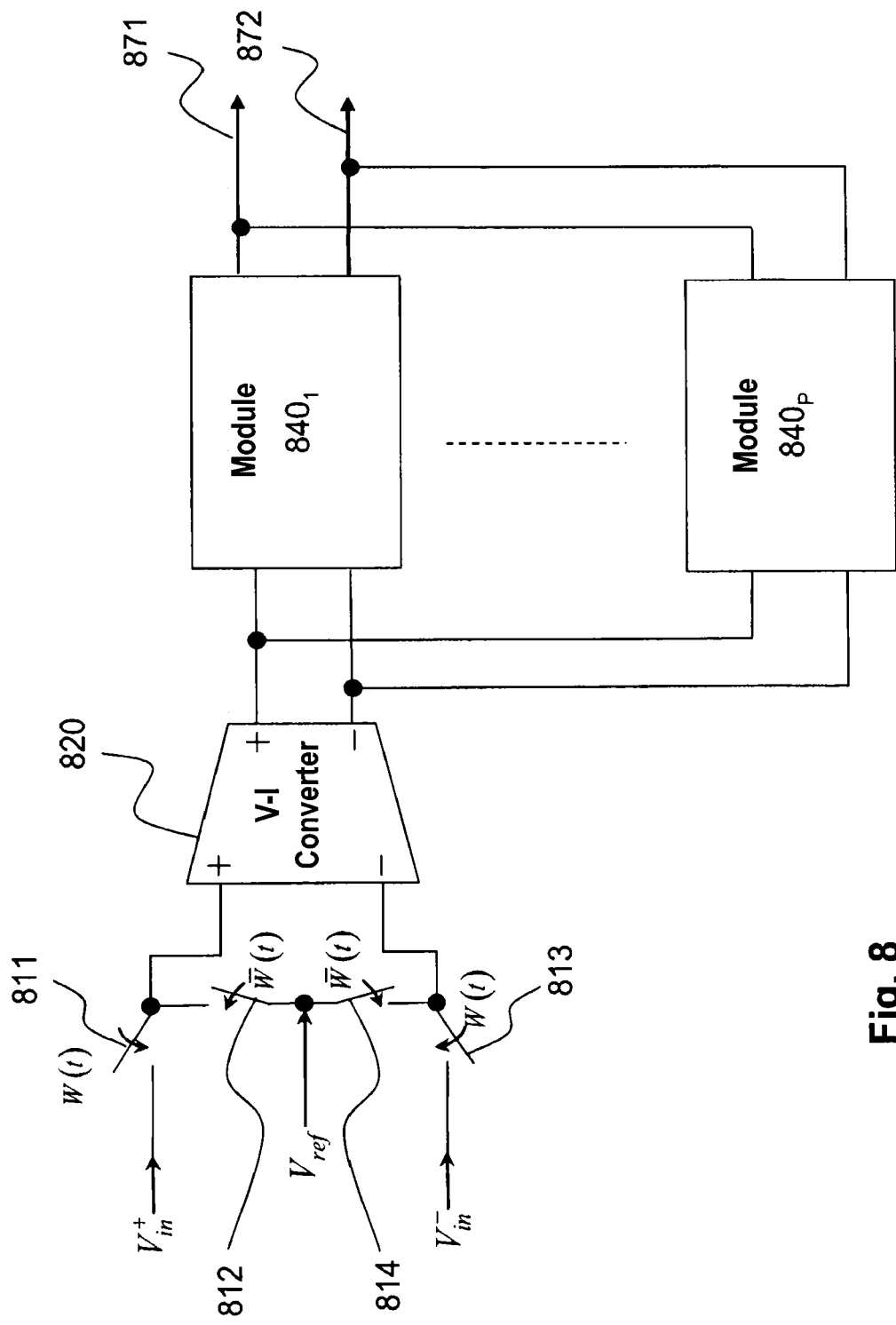
FIG. 8 shows a first alternative embodiment of the integrator circuit of FIG. 7.

FIG. 8 shows a first alternative of the integrator circuit of FIG. 7, in which the input and the output of the circuit are both differential. A plurality of modules $840_p$, p=1, . . . , P are mounted in parallel between the differential output terminals of the conversion module 820 and the differential output terminals 871 and 872 of the circuit.

Figure 8A:
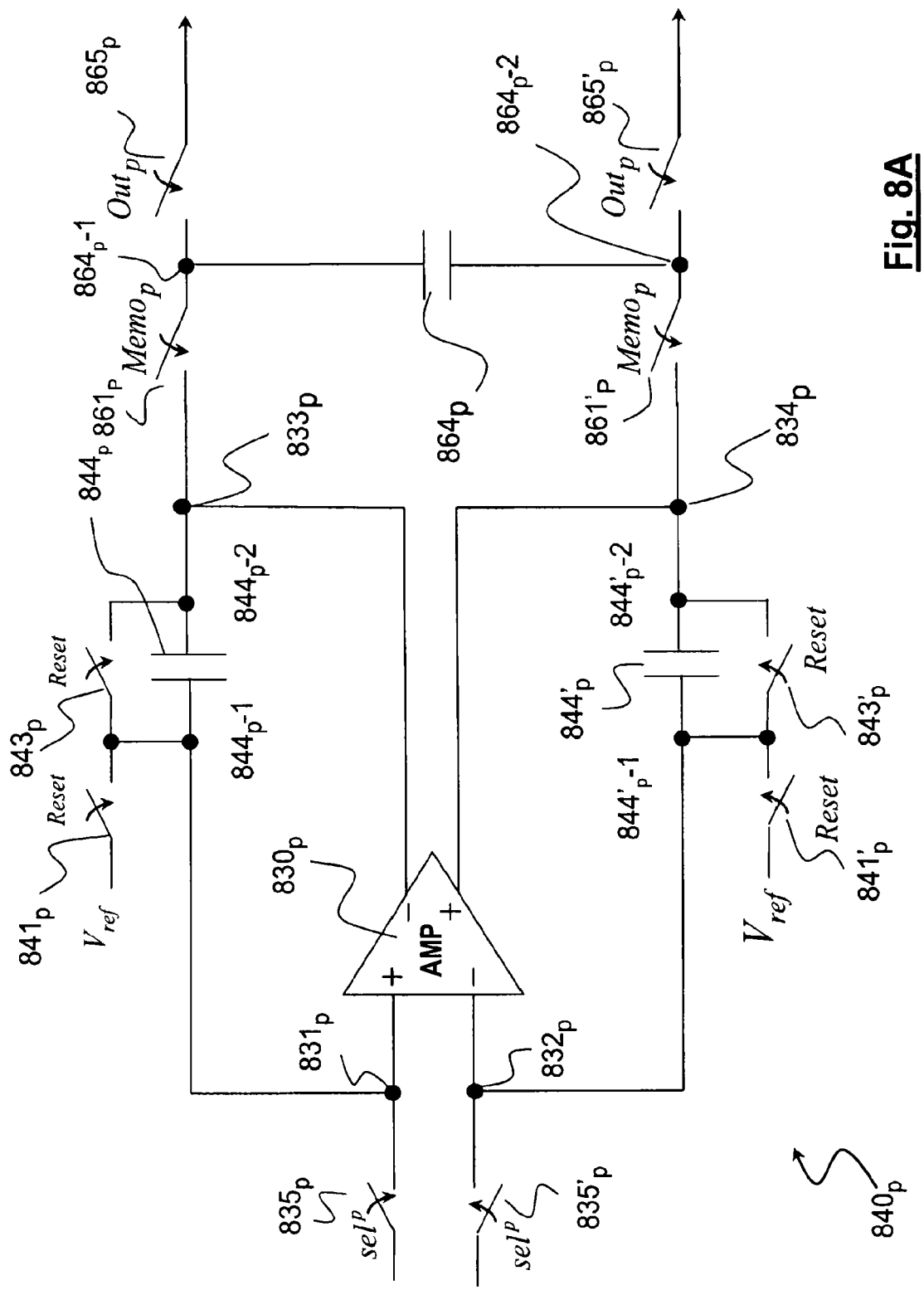
FIG. 8A shows the structure of a module used in the circuit of FIG. 8.

FIG. 8A illustrates the structure of a module $840_p$ of FIG. 8. Unlike the structure of FIG. 7A, the output of this module is differential instead of being single-pole. It will be noted that the two integration paths on either side of the op-amp $830_p$ are symmetrical here.

Figure 9:
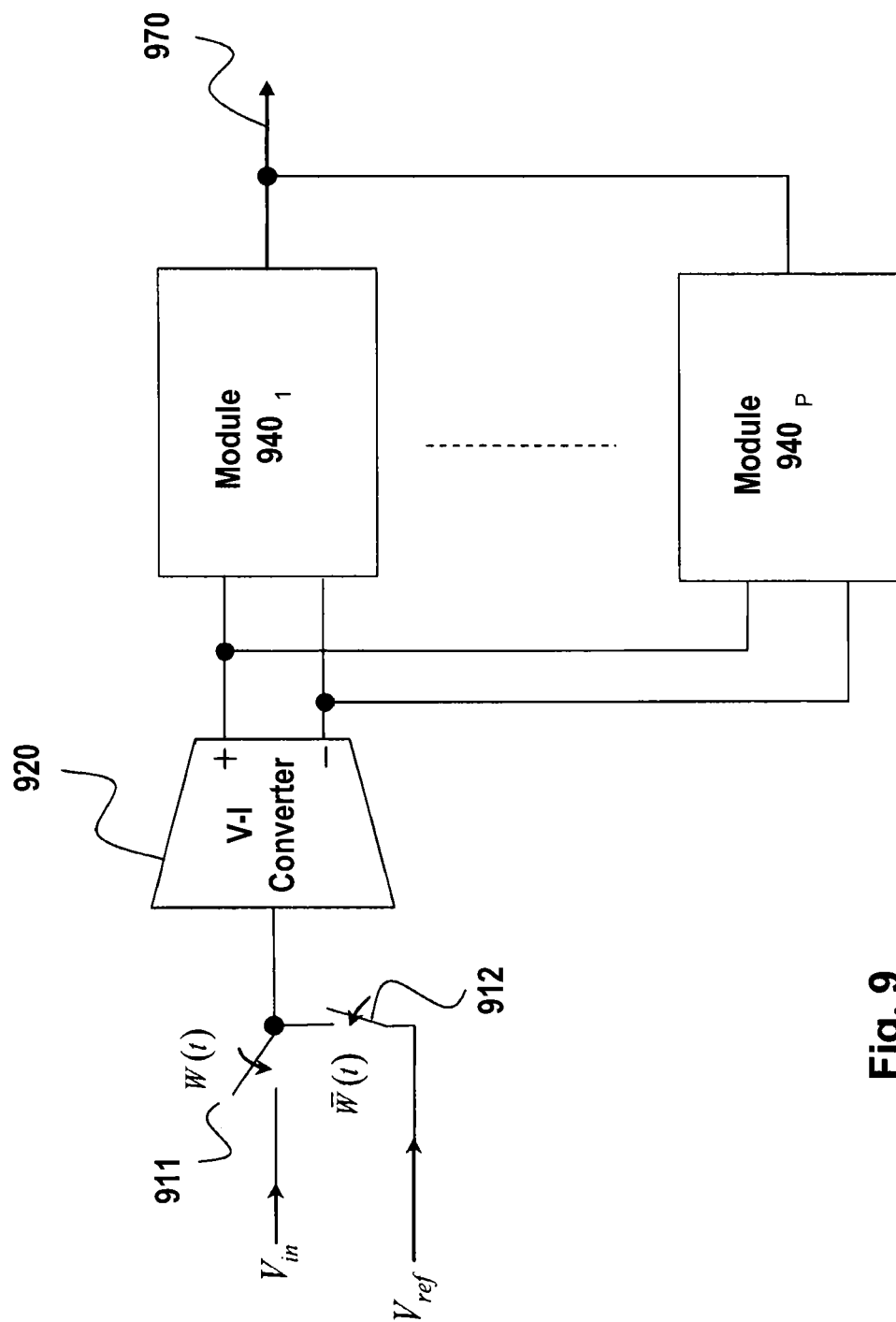
FIGS. 9 and 10 respectively show second and third embodiments of the integrator circuit of FIG. 7.

FIG. 9 shows a second alternative of the integrator circuit of FIG. 7. It differs, however, in that it has a single-pole input instead of a differential input. In other words, the input and the output of the circuit are both single-pole here.

Figure 10:
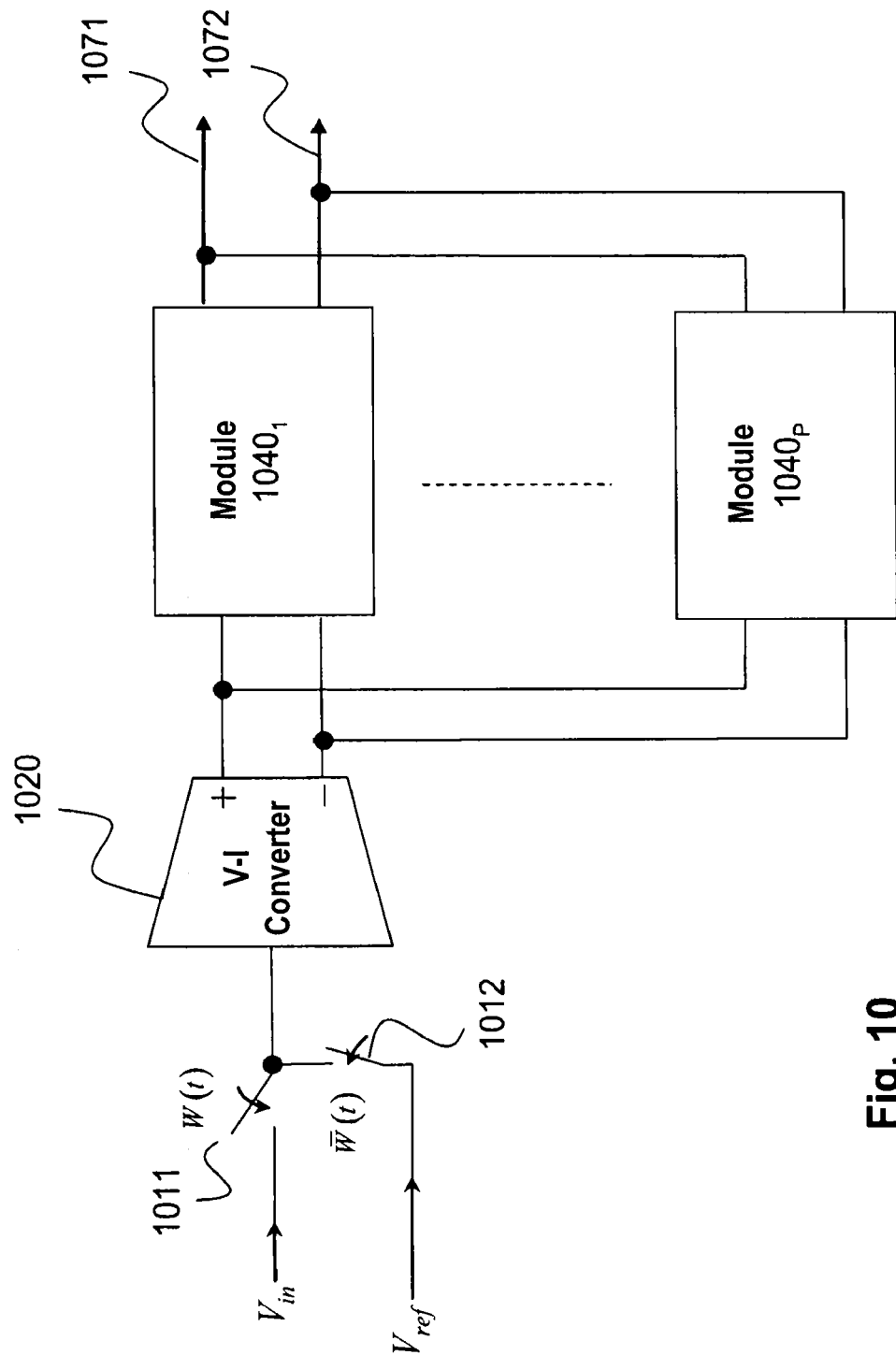

FIG. 10 shows a third alternative of the integrator circuit of FIG. 7. It differs from the first alternative in that the input is single-pole, and from the second alternative in that the output is differential.

In FIGS. 9 and 10, elements identical to those of FIG. 7, 8 are increased by 200, respectively. They will therefore not be described again.

Figure 11:
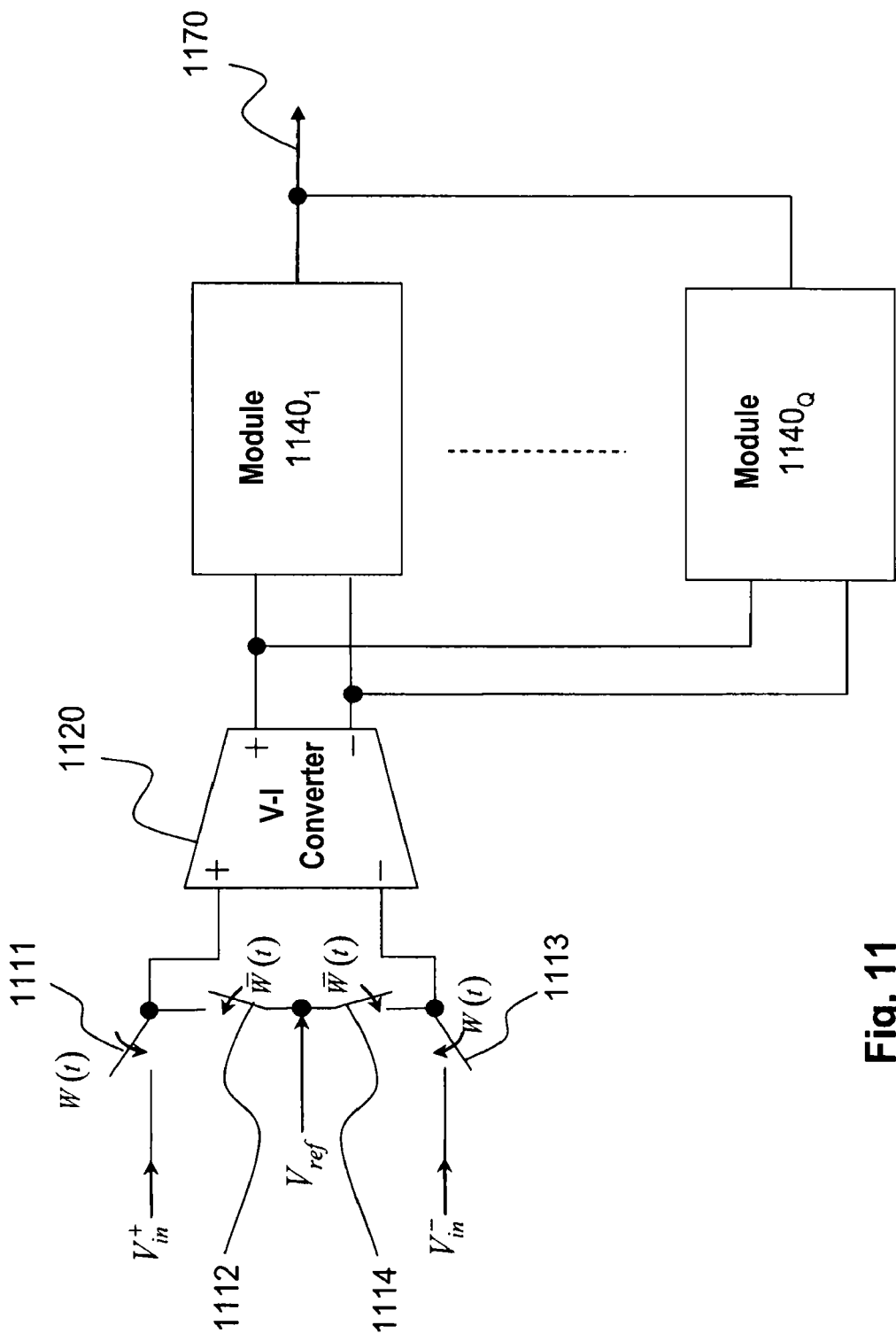
FIG. 11 diagrammatically illustrates an integrator circuit with multiple time window functions according to a third embodiment of the invention.

FIG. 11 shows a third embodiment of the integrator circuit according to the invention. This embodiment is a hybrid form of the first and second embodiments.

The switches 1111 to 1114 as well as the voltage/current conversion module 1120 are identical to those of the preceding embodiments.

A plurality of modules $1140_q$, q=1, . . . , Q, are mounted in parallel on the outputs of the voltage/current conversion module 1120.

Figure 11A:
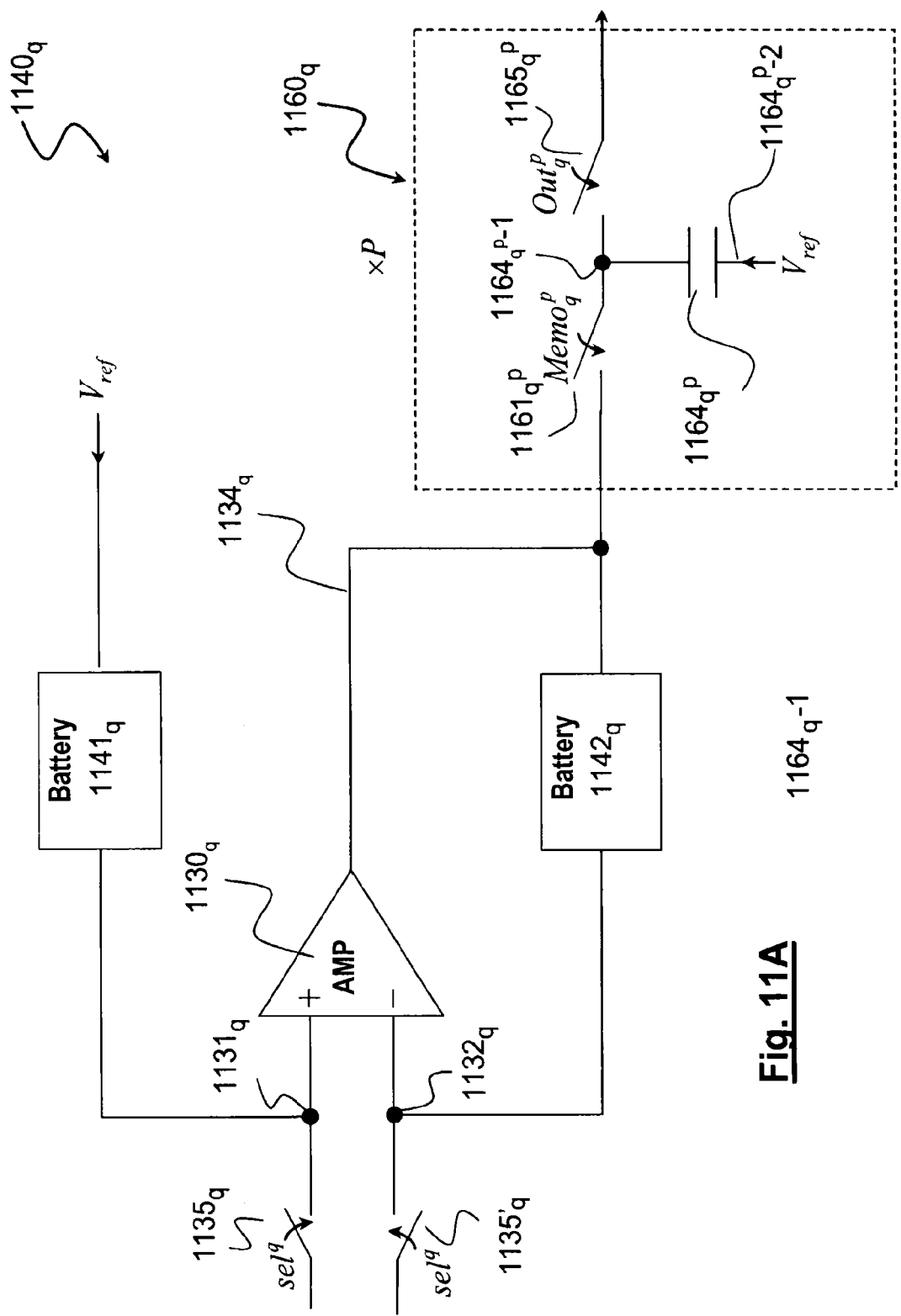
FIG. 11A shows the structure of a module used in the circuit of FIG. 11.

The structure of a module $1140_q$ is illustrated in FIG. 11A. It comprises a functional amplifier $1130_q$ as well as first and second batteries, respectively designated by $1141_q$ and $1142_q$, each including P integration capacitors. The structure of the batteries $1141_q$ and $1142_q$ is identical to that given in FIG. 3A. The battery of integration capacitors $1141_q$ is disposed between the reference voltage $V_{ref}$ and the virtual mass $1131_q$ of the op-amp. However, the battery of integration capacitors $1142_q$ is disposed in a counter-reaction loop between the output of the op-amp and its virtual mass $1132_q$. The output of the battery $1142_q$ is connected to a battery $1160_q$ of P storage capacitors $1164_q^p$, via the respective switches $1161_q^p$, p=1, . . . , P. The charge of the capacitor $1161_q^p$ can be read on the output 1170 by activating the associated switch $1165_q^p$.

It will be understood that the circuit of FIG. 11 supplies QP multiple time window integration paths. These paths are grouped together in subassemblies of P integration paths, the paths of a same subassembly sharing the same voltage/current conversion module, the same op-amp and the same counter-reaction loop. The integration operations of these different paths are multiplexed over time. However, the paths of separate subassemblies only share the voltage/current conversion module. The integration operations of these paths can be done in parallel.

Generally, an integration path is selected here by activating the subassembly selection switches, called first rank, $1135_q$ and $1135'_q$, as well as path selection switches within this subassembly, called second rank.

These second rank switches correspond to the switches $345_1/346_1$ (cf. FIG. 3A) in the batteries $1141_q$ and $1142_q$.

One skilled in the art will understand that, like the first and second embodiments, the third embodiment can be broken down into a first alternative with differential input and differential output, a second alternative with single-pole input and single-pole output, and lastly a third alternative with single-pole input and differential output.

Figure 12:
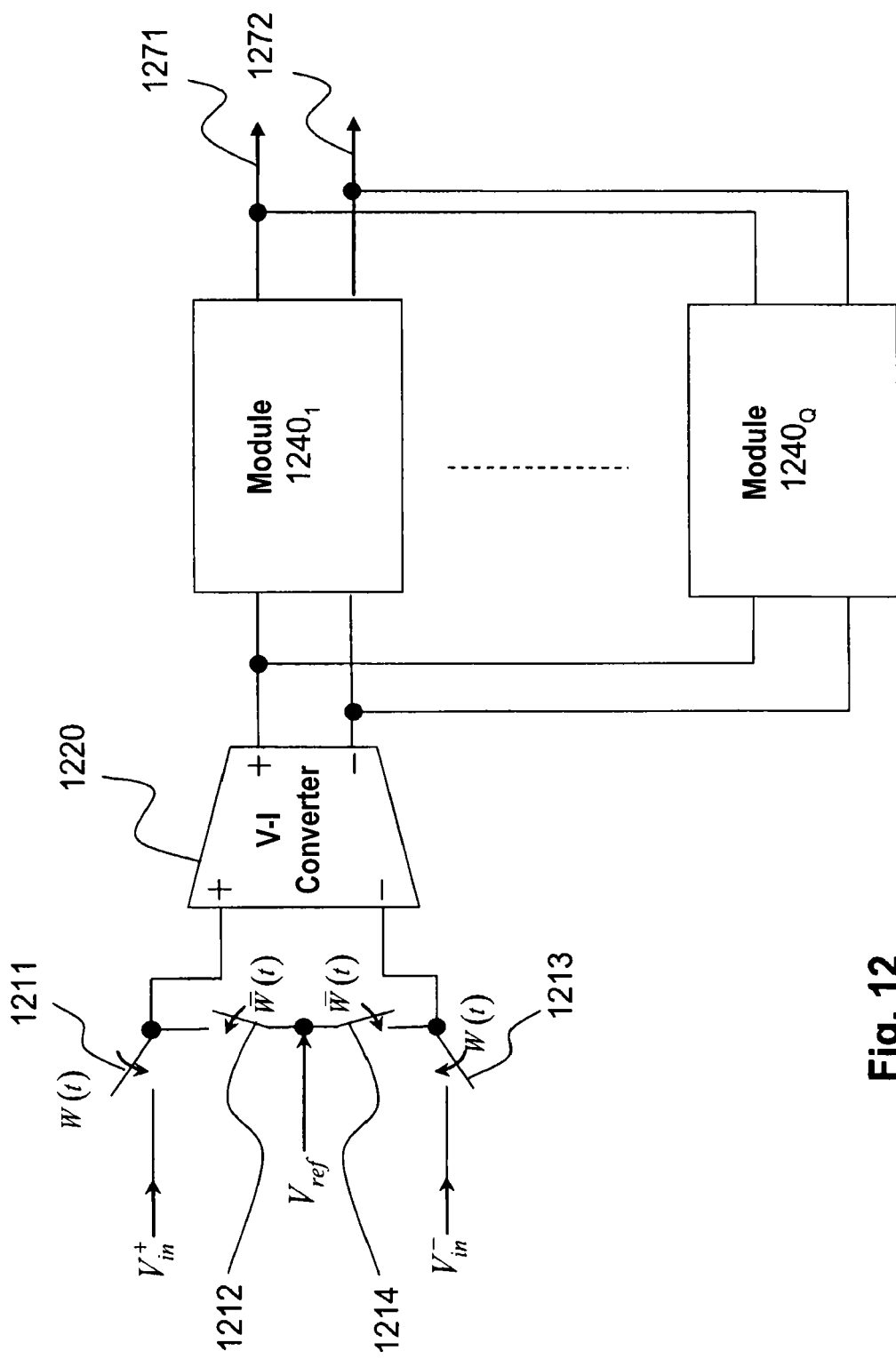
FIG. 12 diagrammatically illustrates a first alternative embodiment of the integrator circuit of FIG. 11.

FIG. 12 illustrates, as an example, the first alternative of the third embodiment. As in FIG. 11, the integrator circuit shown provides a set of QP integration paths with multiple time window functions, these paths being grouped together in subassemblies of P integration paths. Unlike FIG. 11, the modules $1240_q$, q=1, . . . , Q, each have a differential output connected on the output terminals 1271 and 1272 of the integrator circuit.

Figure 12A:
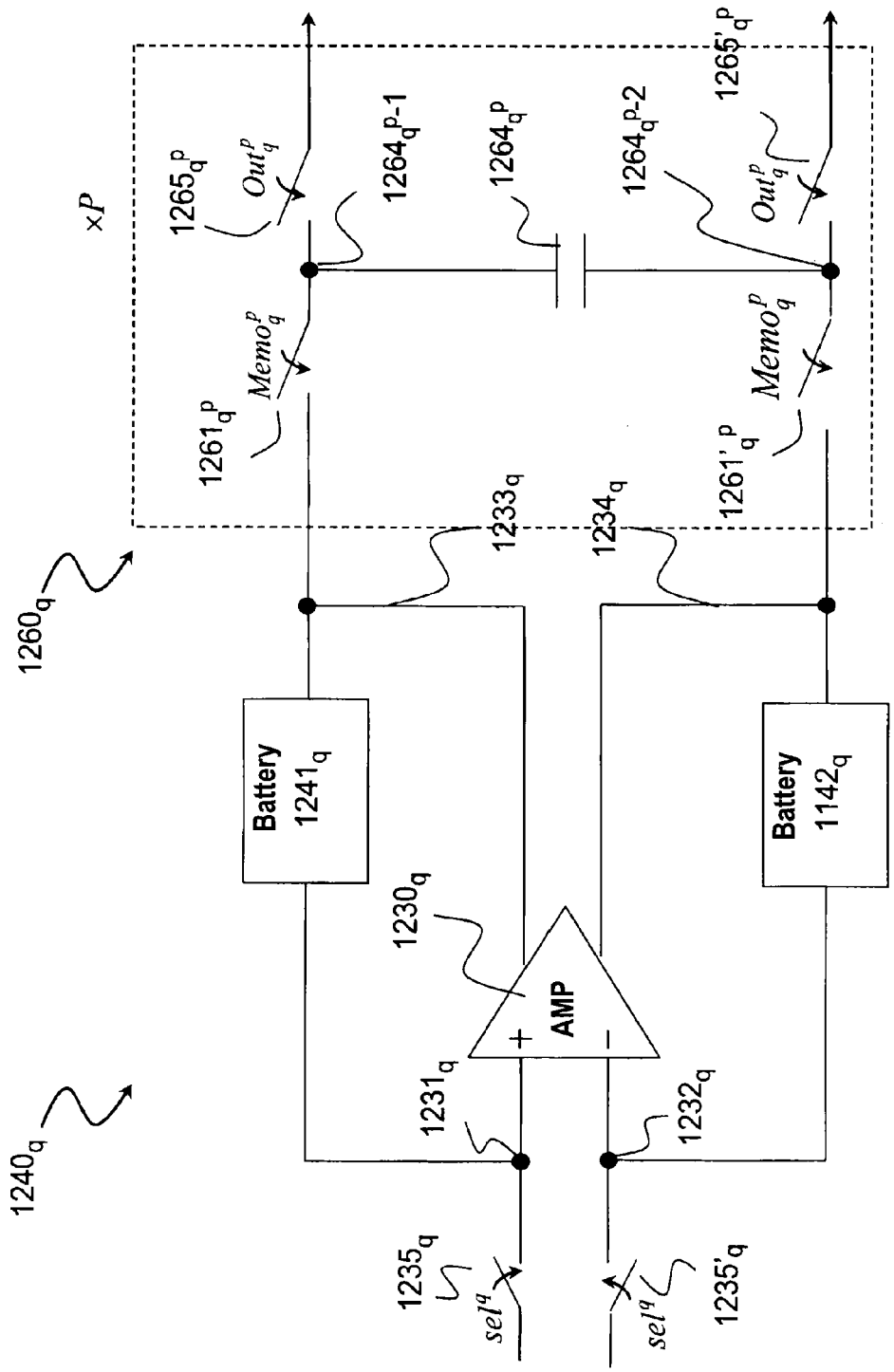
FIG. 12A shows the structure of a module used in the circuit of FIG. 12.

The structure of a module $1240_q$ is illustrated in FIG. 12A. It comprises a functional amplifier $1230_q$ as well as first and second batteries of integration capacitors, respectively designated by $1241_q$ and $1242_q$, each including P capacitors. The structure of the batteries $1241_q$ and $1242_q$ is identical to that given in FIG. 3A. The first battery of integration capacitors $1241_q$ is mounted in counter-reaction between the first output $1233_q$ of the op-amp and its first input $1231_q$. The second battery of integration capacitors $1242_q$ is mounted in counter-reaction between the second output $1234_q$ of the op-amp and its second input $1233_q$. The respective outputs of the batteries of integration capacitors, $1241_q$ and $1242_q$, are connected to a battery of storage capacitors $1260_q$. More specifically, this battery $1260_q$ comprises a plurality P of storage capacitors $1264_q^p$, p=1, ..., P, connected in parallel to the outputs $1233_q$ and $1234_q$ of the op-amp, via the respective switches $1261_q^p$. The voltage at the terminals of the capacitor $1264_q$P can be read between the outputs 1271 and 1272 by activating the reading switches $1165_q^p$ and $1165'_q^p$.

The selection of a given integration path is done as before by activating the selection switches of a subassembly, i.e. first rank and, within that subassembly, by activating the path selection switches, i.e. second rank.

In general, an integrator circuit with multiple time window functions can include an offset due primarily to the mismatching of the MOS transistors making up the inputs of the voltage/current converter and the functional amplifier. This offset can be compensated by post-processing by readjusting the value obtained after integration, by a known and constant factor.

However, when the number of coherent integrations increases, the accumulation of the offset can end up producing a saturation at the output of the functional amplifier(s). This modifies the precision on the integrated value because the integration is no longer done in the linear operating zone. In that case, a post-processing compensation is no longer possible.

Thus, to be able to maintain good precision on the results of the integration, it is necessary to limit the number of coherent integrations to a determined number of about ten integrations.

In order to resolve this problem, and to improve the detectability of the receiver by increasing the number of coherent integrations, the integrator circuit can advantageously be configured to eliminate the accumulation effect of the offset by continuously compensating for it during the integration process.

More particularly, the integrator circuit according to the present invention can be configured to periodically reverse the effect of the offset on the results of the integration. This can be done by adding pairs of switches with alternating switching along the integration path. Thus, for an even number of coherent integrations, the offset is compensated by the fact that it is applied in one direction, then the other on the results of the integration.

Advantageously, in the event the output of the functional amplifier is differential, two pairs of switches with alternating switching can be mounted at the input as well as the output of the functional amplifier.

Likewise, in the event the input of the voltage/current converter is differential, two pairs of switches with alternating switching can be mounted at the input as well as the output of the voltage/current converter.

Thus, the integrator circuit including a voltage/current converter with a differential input (i.e. according to the embodiments of FIGS. 3, 4, 7, 8, 11 and 12) can comprise first and second pairs of switches with alternating switching according to first and second phases mounted upstream of the voltage/current converter and third and fourth pairs of switches with alternating switching according to the first and second phases mounted downstream of the voltage/current converter. Each pair of switches can be controlled by first and second clock signals according to the first and second phases.

Likewise, the integrator circuit including a functional amplifier with differential output (i.e. according to the embodiments of FIGS. 4, 6, 8A and 12A) can comprise fifth and sixth pairs of switches with alternating switching according to the first and second phases mounted upstream of the functional amplifier and seventh and eighth pairs of switches with alternating switching according to the first and second phases mounted downstream of the functional amplifier.

Figure 13:
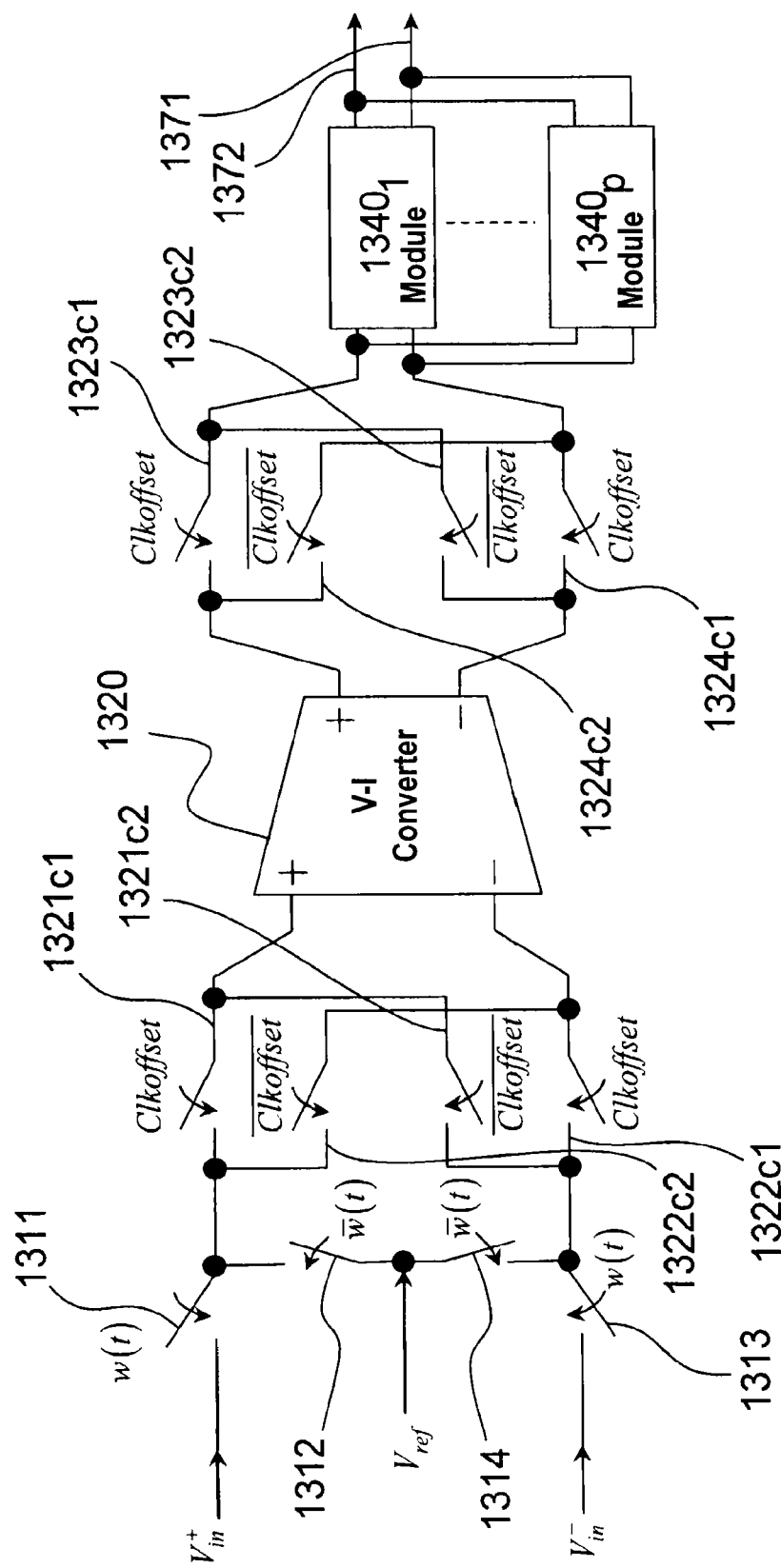
FIG. 13 diagrammatically illustrates an integrator circuit according to FIG. 8 also including means to compensate an offset effect.
Figure 13A:
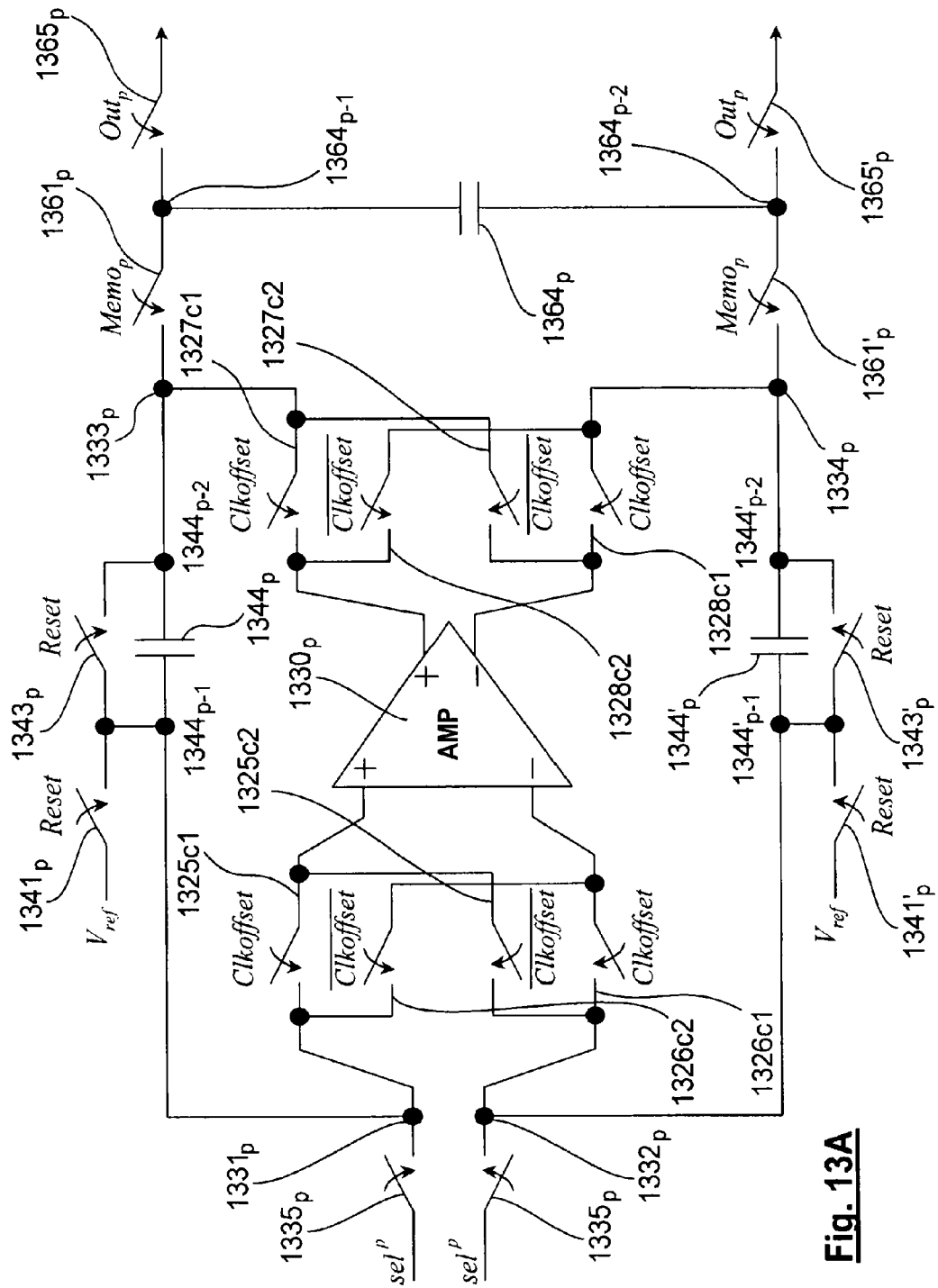
FIG. 13A shows the structure of a module used in the circuit of FIG. 13.

FIGS. 13 and 13A illustrate, as an example, the mounting of pairs of switches in the integrator circuit shown in FIGS. 8 and 8A.

The structure of the integrator circuit of FIG. 13 differs from FIG. 8 in that it includes first ($1321c1$ and $1321c2$) and second ($1322c1$ and $1322c2$) pairs of switches with alternating switching upstream of the conversion module 1320 and third ($1323c1$ and $1323c2$) and fourth ($1324c1$ and $1324c2$) pairs of switches with alternating switching downstream of the conversion module 1320.

More particularly, the first ($1321c1$ and $1321c2$) and second ($1322c1$ and $1322c2$) pairs of switches with alternating switching are inserted between the differential input terminals of the conversion module 1320 on the one hand and the input switches 1311 to 1314 on the other hand.

The third ($1323c1$ and $1323c2$) and fourth ($1324c1$ and $1324c2$) pairs of switches with alternating switching are inserted between the differential output terminals of the conversion module 1320 on the one hand and the modules $1340_1$, ..., $1340_p$ on the other hand.

Furthermore, the structure of the conversion module $1340_p$ of FIG. 13A differs from FIG. 8A in that it includes fifth ($1325c1$ and $1325c2$) and sixth ($1326c1$ and $1326c2$) pairs of switches with alternating switching upstream of the functional amplifier $1330_p$ and seventh ($1327c1$ and $1327c2$) and eighth ($1328c1$ and $1328c2$) pairs of switches with alternating switching downstream of a functional amplifier $1330_p$.

More particularly, the fifth ($1325c1$ and $1325c2$) and sixth ($1326c1$ and $1326c2$) pairs of switches with alternating switching are inserted between the differential input terminals of the functional amplifier $1330_p$ on one hand, and the two switches ($1335_p$ and $1335_p$) controlled by the command sel$^p$ on the other hand.

The seventh ($1327c1$ and $1327c2$) and eighth ($1328c1$ and $1328c2$) pairs of switches with alternating switching are inserted between the differential output terminals of the functional amplifier $1330_p$ on the one hand, and the terminals ($1364_p$-1 and $1364_p$-2) of the storage capacitor $1364_p$ via the transfer switches ($1361_p$ and $1361'_p$) on the other hand.

Figure 13B:
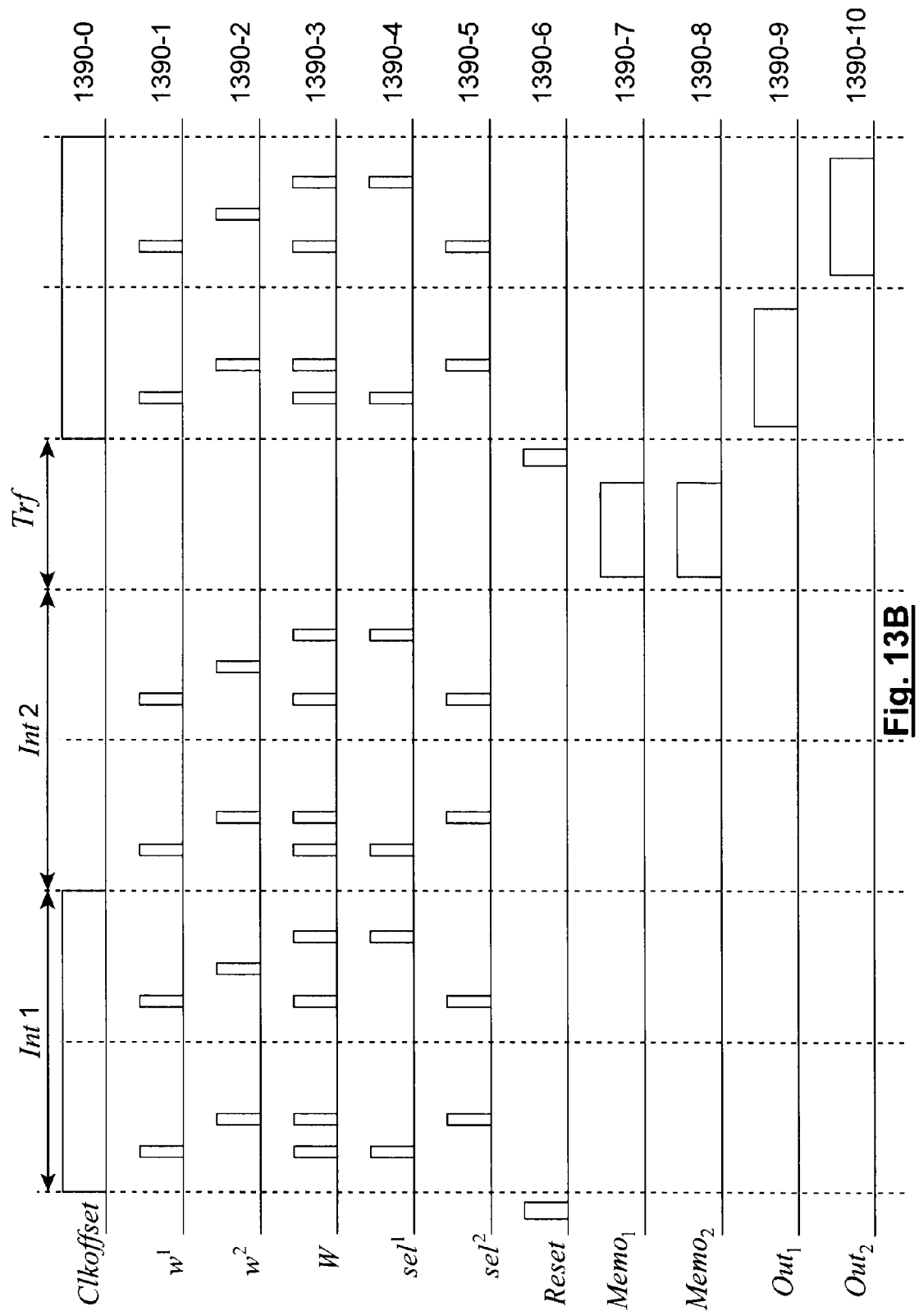
FIG. 13B shows an operating chronogram of the integrator circuit of FIG. 13.

FIG. 13B shows an operating chronogram of the integrator according to the embodiment of FIGS. 13 and 13A, for one example with p=2 and N=2.

The signals shown in 1390-1, ..., 1390-10 are identical to those of FIG. 7B. However, it will be noted that there are two integration cycles Int1 and Int2 before the transfer cycle Trf.

Indeed, for each of the first ($w^1$) and second ($w^2$) multiple window signals, the integration is done twice according to a clock signal clkoffset shown in 1390-0. A first integration Int1 is done in a first phase (or positive phase) corresponding to a clock signal clkoffset=1 and a second integration Int2 in a second phase (or negative phase) corresponding to a clock signal corresponding to clkoffset=0 (i.e. $\overline{\text{clkoffset}}$=1). Thus, the offset applies in a first direction during the first integration and in a second direction opposite the first during the second integration. As a result, the offset produced on the results of the first integration is compensated by that created on the result of the second integration.

Then, as in FIG. 7B, the transfer of the charges is done simultaneously and in parallel during the storage signals Memo$_p$ in 1390-7 and 1390-8 of the transfer cycle. Once all of the integration results have been transferred into the storage capacitors, the reset signal Reset is given in 1390-6. The reading of the stored values can be done, as in FIG. 7B, during the following integration cycle, by sequentially activating the read commands Out$_p$, as indicated in 1390-9 and 1390-10.

It will be noted that in the event the input of the voltage/current converter is single-pole (i.e. according to the embodiments of FIGS. 5, 6, 9, and 10), the offset effect is negligible by design and in that case, it is not useful to add pairs of switches with alternating switching.

Moreover, in the event the output of the functional amplifier is single-pole (i.e. according to the embodiments of FIGS. 3, 5, 7A, and 11A), fifth and sixth pairs of switches with alternating switching according to the first and second phases can be mounted upstream of the functional amplifier in the same way as in the example of FIG. 13B. However, the seventh and eighth pairs of switches with alternating switching according to the first and second phases are, in this case, mounted in the very structure of the functional amplifier so as to reverse the polarity of the single-pole output relative to the input terminals of the functional amplifier.

Figure 14:
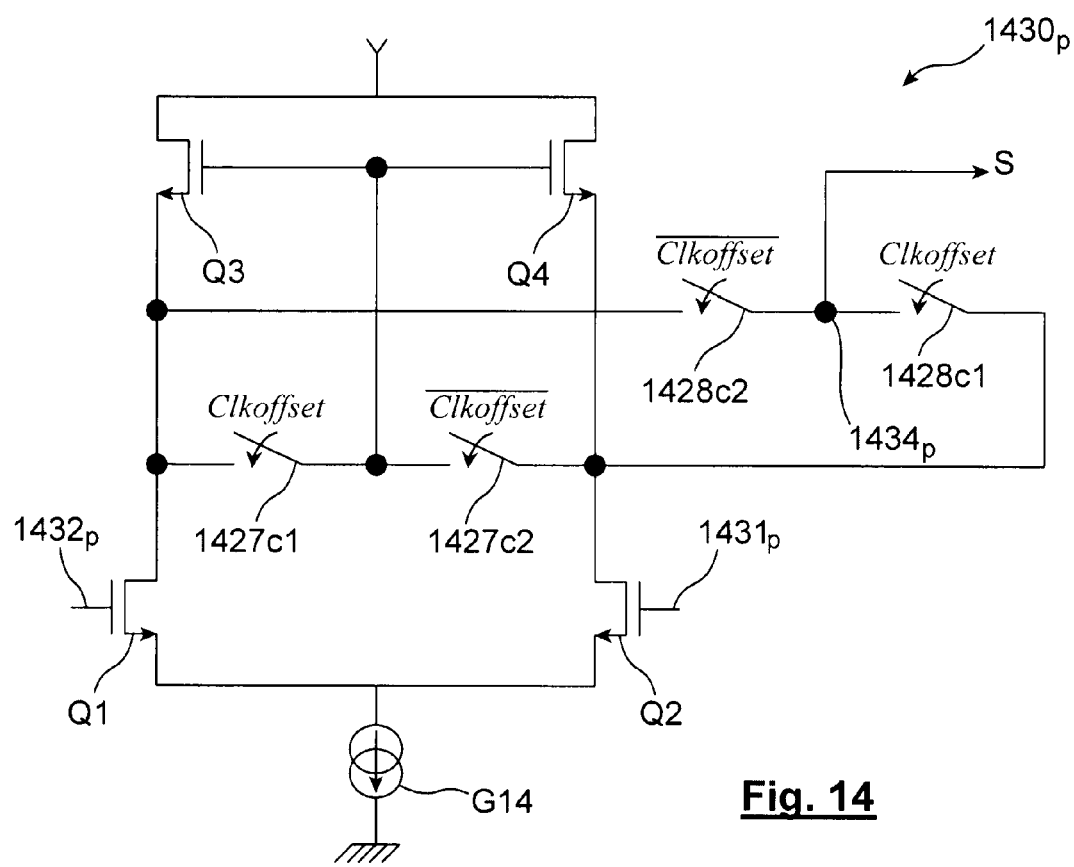
FIG. 14 diagrammatically illustrates the structure of a functional amplifier with a single-pole output including a means to compensate an offset effect according to the invention.

FIG. 14 illustrates, as an example, the mounting of the seventh and eighth pairs of switches with alternating switching in the structure of a functional amplifier with a single-pole output.

This figure diagrammatically shows a functional amplifier 1430$_p$ including a first differential pair of input transistors Q1 and Q2 whereof the drains are respectively connected to the drains of a second pair of transistors Q3 and Q4 of a current mirror and whereof the sources are connected to a current source G14.

A seventh pair (1427c1 and 1427c2) of switches with alternating switching according to the first and second phases is inserted between the drains of the input transistors Q1 and Q2 on the one hand, and the gates of the transistors Q3 and Q4 of the current mirror on the other hand.

Moreover, an eighth pair (1428c1 and 1428c2) of switches with alternating switching according to the first and second phases is inserted between the drains of the input transistors Q1 and Q2 on the one hand, and the single-pole output S terminal 1434$_p$ of the functional amplifier 1430$_p$ on the other hand.

Thus, during the first phase corresponding to the clock signal clkoffset=1, the gates of the transistors Q3 and Q4 of the current mirror are connected to the drain of the transistor Q1 of the reversing input 1432$_p$, while the single-pole output terminal 1434$_p$ is connected to the drain of the transistor Q2 of the non-reversing input 1431$_p$.

However, during the second phase corresponding to the clock signal $\overline{\text{clkoffset}}$=1, the gates of the transistors Q3 and Q4 of the current mirror are connected to the drain of the transistors Q2 of the non-reversing input 1431$_p$, while the single-pole output is connected to the drain of the transistor Q1 of the reversing input 1432$_p$.

As a result, the offset applies in a first direction during the first integration (first phase) and in the opposite direction during the second integration (second phase).

One skilled in the art will understand that, as illustrated as an example in the embodiments of FIGS. 13, 13A, 13B, and 14, pairs of switches with alternating switching can also be inserted into the other embodiments of the present invention.

The invention claimed is:

1. An integrator circuit with multiple time window functions for carrying out a plurality of integration operations in parallel, each integration operation being carried out in a coherent manner over a sequence of time windows including at least one such window, said circuit comprising:
   a plurality of integration paths each corresponding to an integration operation,
   wherein said integration paths share a same voltage/current converter and a same first switching means for switching a signal to be integrated at an input of said converter, said first switching means being controlled by a composite signal obtained using an OR logic of multiple window function signals, each multiple window function signal including a plurality of disjointed time windows,
   each integration path further including at least one integration capacitor mounted to provide feedback to a functional amplifier and receiving a current via a second switching means for selecting said path.

2. The integrator circuit according to claim 1, further comprising a third switching means for transferring an integrated charge in each integration capacitor towards a corresponding storage capacitor, when said plurality of integration operations are finished.

3. The integrator circuit according to claim 2, further comprising a fourth switching means to switch voltages at terminals of said storage capacitors towards an output of the integrator circuit, after transfer of charges from the integration capacitors to corresponding of the storage capacitors has been completed.

4. The integrator circuit according to claim 1, wherein the first switching means comprises at least a first switch controlled by said composite signal and at least a second switch controlled by a complementary composite signal.

5. The integrator circuit according to claim 4, wherein said converter has a differential input and the first switching means applies the signal to be integrated between the input terminals of said converter when the composite is active and a reference voltage at each of these terminals when the complementary composite signal is active.

6. The integrator circuit according to claim 4, wherein said converter has a single-pole input and the first switching means applies the signal to be integrated to the input terminal of said converter, when the composite signal is active, and a reference voltage at said terminal when the complementary composite signal is active.

7. The integrator circuit according to claim 1, wherein said integration paths share a same functional amplifier, inputs of said amplifier respectively being connected to outputs of said converter, and wherein each path comprises a reference capacitor disposed between a reference voltage and a first input of the functional amplifier and one of the at least one integration capacitor mounted to provide feedback between an output of the functional amplifier and a second input of the functional amplifier.

8. The integrator circuit according to claim 7, wherein the second switching means is controlled by a path selection signal, and
   it connects, when the selection signal is at a high logic level:
   a first terminal of the reference capacitor to the reference voltage and the second terminal of said reference capacitor to the first input of the functional amplifier;
   a first terminal of the integration capacitor to the output of the functional amplifier and the second terminal of the integration capacitor to the second input of the functional amplifier; and when the selection signal is at a low logic level:
  disconnects the first terminal of the reference capacitor from the reference voltage and connects the second terminal of the capacitor to the reference voltage;
  disconnects the first terminal of the integration capacitor from the output of the functional amplifier and connects the second terminal of this capacitor to the reference voltage.

9. The integrator circuit according to claim 8, further comprising reset means for applying said reference voltage simultaneously to the first and second terminals of the reference capacitor and to first and second terminals of the integration capacitor when a reset is completed.

10. The integrator circuit according to claim 9, wherein the storage capacitors are mounted in parallel at the output of the functional amplifier, each storage capacitor having a first terminal connected to said output via a third switching means and a second terminal connected to said reference voltage.

11. The integrator circuit according to claim 10, wherein said first terminals of the storage capacitors are also connected to the output of the integrator circuit via a fourth switching means.

12. The integrator circuit according to claim 1, wherein said integration paths share a same functional amplifier, inputs of said amplifier respectively being connected to the outputs of said converter, and wherein each path comprises a first one of the at least one integration capacitor disposed to provide feedback between a first output and a first input of the functional amplifier and a second one of the at least one integration capacitor disposed to provide feedback between a second output and a second input of the functional amplifier.

13. The integrator circuit according to claim 12, wherein the second switching means is controlled by a path selection signal, and
  connects, when this selection signal is at a high logic level:
    a first terminal of the first one of the at least one integration capacitor to the first output of the functional amplifier and the second terminal of the first one of the at least one integration capacitor to the first input of the functional amplifier;
    a first terminal of the second one of the at least one integration capacitor to the second output of the functional amplifier and the second terminal of the second one of the at least one capacitor to the second input of the functional amplifier; and
  when the selection signal is at a low logic level:
    disconnects the first terminal of the first one of the at least one integration capacitor from the first output of the functional amplifier and connects the second terminal of the first one of the at least one integration capacitor to the reference voltage;
    disconnects the first terminal of the second one of the at least one integration capacitor from the second output of the functional amplifier and connects the second terminal of the second one of the at least one capacitor to the reference voltage.

14. The integrator circuit according to claim 13, further comprising reset means applying said reference voltage simultaneously to the first and second terminals of the first of the at least one integration capacitor and to first and second terminals of the second one of the at least one integration capacitor when a reset is completed.

15. The integrator circuit according to claim 14, wherein storage capacitors are mounted in parallel between the first and second outputs of the functional amplifier, each storage capacitor having a first terminal and a second terminal respectively connected to the first and second outputs of the functional amplifier via the third switching means.

16. The integrator circuit according to claim 15, wherein said first terminals of the storage capacitors are connected to a first output of the integrator circuit and said second terminals of the storage capacitors are connected to a second output of the integrator circuit, via a fourth switching means.

17. The integrator circuit according to claim 1, wherein each integration path comprises a functional amplifier, inputs of said amplifier respectively being connected to the outputs of said converter via the second switching means.

18. The integrator circuit according to claim 17, wherein a reference capacitor is disposed between a reference voltage and a first input of the functional amplifier and the at least one integration capacitor is disposed to provide feedback between the output of the functional amplifier and its second input.

19. The integrator circuit according to claim 18, wherein the second switching means is controlled by a path selection signal, and for each path, it connects and disconnects, when this selection signal is at a high logic level and a low logic level, respectively, the outputs of the converter to the inputs of the functional amplifier.

20. The integrator circuit according to claim 19, further comprising, for each path, reset means for applying said reference voltage simultaneously to the first and second terminals of the reference capacitor and to the first and second terminals of the at least one integration capacitor, when a reset is completed.

21. The integrator circuit according to claim 20, further comprising, for each path, a storage capacitor having a first terminal connected to the output of the functional amplifier, via a third switching means, and a second terminal connected to said reference voltage.

22. The integrator circuit according to claim 21, wherein said first terminal of the storage capacitor is also connected to the output of the integrator circuit via a fourth switching means.

23. The integrator circuit according to claim 17, wherein a first one of the at least one integration capacitor is mounted to provide feedback between a first output and a first input of the functional amplifier and a second one of the at least one integration capacitor is mounted to provide feedback between a second output of the functional amplifier and a second input of the functional amplifier.

24. The integrator circuit according to claim 23, wherein the second switching means is controlled by a path selection signal and, for each path, it connects and disconnects when this selection signal is at a high logic level and at a low level, respectively, the outputs of the converter to the inputs of the functional amplifier.

25. The integrator circuit according to claim 24, further comprising, for each path, reset means for applying said reference voltage simultaneously to the first and second terminals of the first one of the at least one integration capacitor and the first and second terminals of the second one of the at least one integration capacitor, when a reset is completed.

26. The integrator circuit according to claim 25, further comprising, for each path, a storage capacitor having a first terminal connected to the first output of the functional amplifier and a second terminal connected to its second output, via a third switching means.

27. The integrator circuit according to claim 26, wherein said first and second terminals of the storage capacitor are also connected via a fourth switching means, respectively to a first output and to a second output of the integrator circuit.

28. The integrator circuit according to claim 1, wherein said integration paths are distributed in a plurality of subassemblies and the second switching means comprises a first rank second means for selecting a subassembly of paths among said plurality of subassemblies, and second rank second means for selecting a path within a subassembly, and wherein each subassembly of paths comprises a functional amplifier, the inputs of said amplifier respectively being connected to the outputs of said converter via the first rank second means, the paths of a subassembly sharing the functional amplifier relative to this subassembly, each path of said subassembly comprising a reference capacitor disposed between a reference voltage and a first input of said amplifier and one of the at least one integration capacitor mounted to provide feedback between the output of said amplifier and a second input of the amplifier.

29. The integrator circuit according to claim 1, wherein said integration paths are distributed in a plurality of subassemblies and the second switching means comprises a first rank second means for selecting a subassembly of paths among said plurality of subassemblies and a second rank second means for selecting a path within a subassembly, and wherein each subassembly of paths comprises a functional amplifier, inputs of said amplifier being respectively connected to the outputs of said converter via the first rank second means, the paths of a subassembly share the functional amplifier relative to that subassembly, each path of said subassembly comprising a first one of the at least one integration capacitor mounted to provide feedback between a first output and a first input of this amplifier and a second one of the at least one integration capacitor mounted to provide feedback between a second output and a second input of the amplifier.

30. The integrator circuit according to claim 1, wherein when the voltage/current converter has a differential input, the integrator circuit comprises first and second pairs of switches with alternating switching of the first and second phases mounted upstream of said voltage/current converter and third and fourth pairs of switches with alternating switching according to the first and second phases mounted downstream of said voltage/current converter.

31. The integrator circuit according to claim 1, wherein when the functional amplifier has a differential output, the integrator circuit comprises fifth and sixth pairs of switches with alternating switching according to the first and second phases mounted upstream of said functional amplifier and seventh and eighth pairs of switches with alternating switching according to the first and second phases mounted downstream of said functional amplifier.

32. The integrator circuit according to claim 1, wherein when the functional amplifier has a single-pole output, the integrator circuit comprises fifth and sixth pairs of switches with alternating switching according to the first and second phases mounted upstream of said functional amplifier and seventh and eighth pairs of switches with alternating switching according to the first and second phases mounted in the structure of the functional amplifier to reverse the polarity of said single-pole output relative to the input terminals of said functional amplifier.

* * * * *

UNITED STATES PATENT AND TRADEMARK OFFICE
CERTIFICATE OF CORRECTION

PATENT NO. : 8,564,358 B2
APPLICATION NO. : 13/139876
DATED : October 22, 2013
INVENTOR(S) : Gilles Masson It is certified that error appears in the above-identified patent and that said Letters Patent is hereby corrected as shown below:

On the title page, Item (73), the Assignee's Information is incorrect. Item (73) should read:

--(73) Assignee: Commissariat a l'Energie Atomique et aux Energies Alternatives, Paris (FR)--

Signed and Sealed this
Tenth Day of December, 2013

Margaret A. Focarino
*Commissioner for Patents of the United States Patent and Trademark Office*